(12) United States Patent
Dhawan et al.

(10) Patent No.: US 11,444,338 B1
(45) Date of Patent: Sep. 13, 2022

(54) SMART BATTERY SYSTEM

(71) Applicant: KNOETIK SOLUTIONS, INC., North Potomac, MD (US)

(72) Inventors: Kyra Dhawan, North Potomac, MD (US); Kian Dhawan, North Potomac, MD (US)

(73) Assignee: KNOETIK SOLUTIONS, INC., North Potomac, MD (US)

( * ) Notice: Subject to any disclaimer, the term of this patent is extended or adjusted under 35 U.S.C. 154(b) by 0 days.

(21) Appl. No.: 17/538,125

(22) Filed: Nov. 30, 2021

(51) Int. Cl.
| | |
|---|---|
| *H02J 7/00* | (2006.01) |
| *H01M 10/42* | (2006.01) |
| *H01M 50/569* | (2021.01) |
| *H01M 10/48* | (2006.01) |
| *B60L 58/12* | (2019.01) |
| *B60L 50/64* | (2019.01) |
| *B60L 3/00* | (2019.01) |

(52) U.S. Cl.
CPC ....... *H01M 10/4257* (2013.01); *B60L 3/0046* (2013.01); *B60L 50/64* (2019.02); *B60L 58/12* (2019.02); *H01M 10/486* (2013.01); *H01M 50/569* (2021.01); *B60L 2240/545* (2013.01); *H01M 2010/4271* (2013.01); *H01M 2010/4278* (2013.01); *H01M 2220/20* (2013.01)

(58) Field of Classification Search
CPC ........... H01M 10/4257; H01M 10/486; H01M 50/569; H01M 2010/4271; H01M 2010/4278; H01M 2220/20; B60L 3/0046; B60L 50/64; B60L 58/12; B60L 2240/545

USPC ................ 320/109; 701/22; 702/63
See application file for complete search history.

(56) References Cited

U.S. PATENT DOCUMENTS

| | | |
|---|---|---|
| 9,124,085 B2 | 9/2015 | Wu et al. |
| 9,496,730 B2 | 11/2016 | Gallegos et al. |
| 10,197,631 B2 | 2/2019 | Barfield, Jr. et al. |
| 10,505,240 B1 | 12/2019 | Bruce et al. |
| 10,821,843 B2 | 11/2020 | Slepchenkov et al. |
| 10,921,381 B2 | 2/2021 | Karner et al. |

(Continued)

FOREIGN PATENT DOCUMENTS

| | | |
|---|---|---|
| CN | 109755687 A | 5/2019 |
| CN | 112688405 A | 4/2021 |

*Primary Examiner* — Zixuan Zhou
(74) *Attorney, Agent, or Firm* — Dave Law Group LLC; Raj S. Dave

(57) ABSTRACT

The present invention discloses a system comprising: a rechargeable energy storage battery system comprising a monitoring module and an Internet of Things (IoT) based control module; a block chain network; a processor; and a tangible non-transitory memory; wherein system is operable to receiving periodically by a smart battery management platform, battery related information and one or more environment factors; extracting, processing and analyzing, the battery related information to retrieve a real-time feature of the rechargeable energy storage battery system and the one or more environment factors affecting the battery life and the battery performance by a smart battery management platform; predicting in real-time battery health and life status by the smart battery management platform; rendering using immersive technology, real-time simulated display of situational awareness by a battery management platform; and sending a control signal to the IoT based control module of the rechargeable energy storage battery system.

18 Claims, 15 Drawing Sheets

(56) References Cited

U.S. PATENT DOCUMENTS

| | | | |
|---|---|---|---|
| 11,035,903 B2 | 6/2021 | Narayanaswami | |
| 2006/0276980 A1 | 12/2006 | Mizuno et al. | |
| 2019/0377029 A1* | 12/2019 | Shiiyama | G01R 31/367 |
| 2020/0055421 A1* | 2/2020 | Sastinsky | G06F 9/451 |
| 2021/0221247 A1 | 7/2021 | Daniel et al. | |
| 2021/0339649 A1* | 11/2021 | Ueno | B60L 58/21 |

\* cited by examiner

SMART BATTERY SYSTEM

FIELD OF THE INVENTION

An embodiment relates to systems and methods for a smart battery system, and more particularly to an artificial intelligence-based cloud centric platform for battery internal energy monitoring and management leveraging smart materials.

BACKGROUND

A rechargeable energy storage device's capacity is a measure of how much energy can be stored and eventually discharged by the device. Rechargeable energy storage devices are important systems for energy storage, with applications in electronics, EVs, telephone communication systems, power supplies, and many other applications.

Electric vehicles (EVs) are of great interest for transportation applications and can provide benefits of low or zero emissions, quiet operation, and reduced dependence on fossil fuels. However, conventional electric vehicles that rely primarily or exclusively on battery power for power train and propulsion may suffer degradation in vehicle range when the vehicle is operated near extremes of ambient environmental temperatures, particularly at colder temperatures. Hence smart thermal management in electric vehicles is important.

Battery chargers are also important components in the development of electric vehicles. Historically, two types of chargers for EV application are known. One is a standalone type where functionality and style can be compared to a gas station to perform rapid charging. The other is an on-board type, which would be used for slower C-rate charging from a conventional household outlet. The national grid delivers AC (Alternating Current), but electric cars need DC (Direct Current) to charge their battery pack. Type 1 and Type 2 connectors are the most commonly used AC sockets. For fast charging, the CHAdeMO and SAE Combo (also known as Type 2 CCS, which stands for "Combined Charging System") are the most commonly used DC connectors. EVs typically include energy storage devices such as low voltage batteries (for range and cruising, for example), high voltage batteries (for boost and acceleration, for example), and ultracapacitors (for boost and acceleration, for example), to name a few. Because these energy storage devices operate under different voltages and are charged differently from one another, typically each storage device includes its own unique charging system. This can lead to multiple components and charging systems because the storage devices typically cannot be charged using charging systems for other storage devices. In other words, a charging device used to charge a low-voltage battery typically cannot be used to charge an ultracapacitor or a high-voltage battery. Hence intelligent or smart devices in EV's are necessary. The problem was partially solved but still has significant problems.

"With the development of automotive electronic and electrical technology, more and more advanced electronic and electrical equipment are used in automobiles, causing the electrical load of the vehicle to increase sharply, and putting heavy pressure on the vehicle power supply network system. As one of the main providers of automotive power supply, the battery life problem is becoming more and more prominent. The simple constant voltage output mode wastes energy. Continuous overcharging will reduce the battery life. Simple energy recovery limits the generator voltage, often due to control. The mismatch between the method and the battery brings a lot of after-sales power loss problems. The battery life is reduced. The cost of replacing the battery is greater than the benefits of fuel saving, which is unacceptable to users. This has caused strong user complaints. Analysis of after-sales battery disassembly, the reason for the decrease in battery life and the highest proportion of battery failure is that the battery is vulcanized due to power loss. At the same time, as the severity of battery vulcanization increases, eventually irreversible internal crystallization occurs, resulting in final failure and scrap. The user must replace the battery. In addition to direct economic losses for OEMs and battery suppliers, word-of-mouth image is also damaged. For vehicle users, it is a direct economic loss, as well as the daily complaints and troubles of using the vehicle. For the battery itself, it does not play its due performance, and ends up early and is scrapped. Therefore, a vehicle-mounted intelligent charging system and control method that can prolong the service life of the battery came into being. The system can increase the charging voltage of the generator on demand through the LIN communication control, and through the set control method, the battery can be regularly desulfurized to maintain a long-lasting health state and effectively extend the battery life." [Source: Vehicle-mounted intelligent charging system for prolonging service life of storage battery and control method thereof; Yichi et. al. published as CN112688405A on Apr. 20, 2021.]

"An on-vehicle battery system is mostly composed of a secondary battery such as a lead battery. In such a secondary battery, a degree of degradation gives fluctuations to correlations between electric quantities of a battery, such as voltage and current, and charged state quantities of the battery, such as a State of Charge (SOC) and a State of Health (SOH). The SOC indicates a charged rate [%] of a battery and the SOH indicates a residual capacity [Ah] of a battery. Thus, as the degradation advances in the battery, the precision in detecting the SOC and/or SOH will also be degraded, whereby the SOC and/or SOH will fluctuate battery by battery. These problems make it difficult to detect, with precision, the SOC and/or SOH of each of secondary batteries which are mass-produced. Therefore, to avoid such fluctuations on the safe side, the fluctuations should be considered in a usable charge and discharge range of each second battery, with the result that the range is obliged to be narrower." [Source: Method and apparatus for detecting charged state of secondary battery based on neural network calculation; Mizuno et. al. published as US20060276980A1 on Dec. 7, 2006.]

"An integrated Battery Management System (BMS) may enable cell monitoring, temperature monitoring, cell balancing, string current monitoring, and charger control integration. The BMS may be integrated into battery packs to give early warning to potential problems with weaker battery cells within the string of a battery back. The BMS may give feedback on cell voltages and temperatures within the battery modules to ensure a healthy battery pack." [Source: Systems and methods for battery management; Nicky G. Gallegos and Michael Walker issued as U.S. Pat. No. 9,496,730B2 on Nov. 15, 2016.]

"In view of the problems of current battery charging and discharging in a low temperature environment, most of the measures taken are to configure an additional PTC heater device or an electric heating film to raise the temperature of the battery; the battery rises rapidly during high load operation, and the battery cools. The effect is poor, so that the temperature difference inside the battery cannot meet the operation requirements, which leads to the reduction of power of the whole vehicle. However, the above processing methods may have the following defects: 1. The preheating or cooling time is too long; 2. The heating temperature cannot be set according to the different environments in which the battery is located, and fixing the heater temperature to a certain value inevitably causes waste of resources, and If the heater temperature is fixed at a certain value, the battery temperature may be too high, causing the battery to over-expand or even explode, affecting the performance of the battery and causing safety problems." [Source: System for precisely heating and cooling battery through graphene film and control method of system; Ming et. al. published as CN109755687A on May 14, 2019.]

"The data collected during the use of the battery may be recorded on the blockchain ledger. This data may also include time series information of current draws, weather information (temperature, humidity, wind, etc.), pollution levels, braking information, etc. Having the battery utilization data in the blockchain provides for immutability and verifiability of the data, which are the key requirements in a multi-party system. For example, data may be recorded into the blockchain via charging stations, vehicles, battery manufacturer(s), etc." [Source: Monitoring of batteries in blockchain networks; Narayanaswami; issued as U.S. Ser. No. 11/035,903B2 on Jun. 15, 2021.]

"The battery monitor circuit may be formed, in one exemplary embodiment, via coupling of various components to a circuit board. In an exemplary embodiment, the battery monitor circuit further incorporates a real-time clock. The real-time clock may be used, for example, for precisely timing collection of voltage and temperature data for a battery. As described herein, the battery monitor circuit may be positioned internal to the battery and configured to sense an internal temperature of the battery; alternatively, the battery monitor circuit may be positioned external to the battery and configured to sense an external temperature of the battery. In another exemplary embodiment, a battery monitor circuit is positioned within a monobloc to sense an internal temperature of a monobloc. In still another exemplary embodiment, a battery monitor circuit is coupled to a monobloc to sense an external temperature of a monobloc." [Source: Systems and methods for monitoring and presenting battery information; Don Karner et. al.; issued as U.S. Ser. No. 10/921,381B2 on Feb. 2, 2021.]

"Electric Vehicles (EVs) have generated a lot of interest in recent years, due to the advances in battery life and low pollution. Similarly, the expansion of the Internet of Things (IoT) allowed more and more devices to be interconnected. One major problem EVs face today is the limited range of the battery and the limited number of charging or battery swapping stations. A solution is to build the necessary infrastructure, and to be able to correctly estimate the remaining power using an efficient battery management system (BMS). For some EVs, battery swapping can also be an option, either at registered stations, or even directly from other EV drivers. Thus, a network of EV information is required, so that a successful battery charge or swap can be made available for drivers. In this paper two blockchain implementations for an EV BMS are presented, using blockchain as the network and data layer of the application. The first implementation uses Ethereum as the blockchain framework for developing smart contracts, while the second uses a directed acyclic graph (DAG), on top of the IOTA tangle. The two approaches are implemented and compared, demonstrating that both platforms can provide a viable solution for an efficient, semi-decentralized, data-driven BMS."

[Source: Blockchain IoT for Smart Electric Vehicles Battery Management; Florea, Bogdan C., and Dragos D; published on May 13, 2020]

Improving the overall performance and effectiveness of the smart rechargeable batteries and the electric vehicles (EVs) would enhance their gravimetric energy density, measured in watt hours per kilogram, and allow use of safer, easily recyclable smart materials that are abundantly available. Smart material-based anodes, cathodes and electrolytes would be considered as a 'paradigm shift' for greatly enhancing energy density in EV batteries and thereby greatly extending the range output compared to incumbent options.

Therefore, there is a long-felt need for a complete, comprehensive, smart, and intelligent solution for actively and autonomously monitoring, controlling, managing, and powering rechargeable batteries of an electric vehicle in real-time.

SUMMARY

Accordingly, the present invention provides a highly intelligent system and autonomous methods for a smart battery system comprising a next-generation smart, highly efficient, cloud centric platform for battery monitoring, IoT based battery health control, and thermal management. The present disclosure describes one or more aspects of monitoring, controlling, managing, and powering rechargeable batteries, using smart materials, of an electric vehicle in real-time using a next-generation smart, highly efficient, sophisticated intelligent edge and artificial intelligence-based cloud centric platform for battery monitoring, control, and management.

The object of the present invention is to provide highly intelligent systems and autonomous methods for the smart battery system, and a next-generation smart, highly efficient, cloud centric platform for battery monitoring, control, and management. The present invention is slated to revolutionize the future of energy storage devices using smart platforms making everything smarter, intelligent, flexible, smaller, safer, and ecologically sustainable.

In an aspect, a system is described herein. The system comprising: a rechargeable energy storage battery system of an electric vehicle comprising a monitoring module and an Internet of Things (IoT) based control module; a blockchain network; a processor; a tangible non-transitory memory configured to communicate with the processor, wherein the tangible non-transitory memory has stored thereon instructions executable by the system to cause the system to perform operations comprising: connecting the monitoring module and the Internet of Things based control module of the rechargeable energy storage battery system of the electric vehicle, to a smart battery management platform, and the blockchain network that includes a plurality of charging station nodes; receiving periodically by the smart battery management platform, battery related information and one or more environment factors; extracting, processing, and analyzing, the battery related information to retrieve a real-time feature of the rechargeable energy storage battery system and the one or more environment factors that is affecting battery life and battery performance by the smart battery management platform; predicting in real-time, by the smart battery management platform, battery health and life status; rendering using immersive technology, real-time simulated display of situational awareness by the smart battery management platform; and sending a control signal to the Internet of Things based control module of the rechargeable energy storage battery system by the smart battery management platform.

In one embodiment of the system, the rechargeable energy storage battery system comprises at least one of a lithium-ion battery, a lithium iron phosphate battery, a nickel-metal hydride battery, a nickel cobalt aluminum battery, a nickel manganese cobalt battery, an iron-based battery, a sodium-ion battery, a graphene-based battery, a lead-acid battery, and an ultracapacitor.

In another embodiment of the system, the rechargeable energy storage battery system is a smart material-based battery.

In yet another embodiment of the system, the rechargeable energy storage battery system is a graphene-based battery.

In yet another embodiment of the system, the battery related information comprises at least one of a charging voltage, a discharging voltage, a current value, an insulation value, a resistance value, a power, a capacitance, an acquisition time of a battery service cycle, a battery warming characteristic, a vehicle characteristic.

In yet another embodiment of the system, the battery health and life status comprise at least one of a battery performance, a health indicator, a battery life span, an existing charge, an energy capacity, a real-time range, a remaining range and one or more battery faults of the rechargeable energy storage battery system.

In yet another embodiment of the system, the control signal comprises at least one of a temperature regulation signal, a heat regulation signal, a heat utilization signal, a self-charging signal, a cell pack switching signal and an on-off switching signal.

In yet another embodiment of the system, the monitoring module comprises a sensor array and an IoT device interface.

In yet another embodiment of the system, the sensor array comprises nanosensors.

In yet another embodiment of the system, the IoT device interface comprises one or more detectors and one or more computing processors.

In yet another embodiment of the system, the system is further operable to pre-processing of information by the IoT device interface.

In yet another embodiment of the system, the Internet of Things based control module comprises at least one of a smart thermal management system, smart energy management system, a charging management system, and a cell pack switching system.

In yet another embodiment of the system, the system is further operable to detect an anomaly.

In yet another embodiment of the system, the system is further operable to providing notification and decision-making support information.

In yet another embodiment of the system, the system is further operable to detect a failover.

In yet another embodiment of the system, the system is further operable to enable a switchover after detecting the failover.

In yet another embodiment of the system, the system is further operable to fine tuning of a charge curve of a fast-charging session using a pre-trained machine learning model.

In yet another embodiment of the system, the extracting, the predicting, the rendering and the providing automatically is performed by at least one of a statistical analysis, a deep-learning algorithm via a neural network architecture, an artificial intelligence platform, and a risk-based analysis.

In yet another embodiment of the system, the statistical analysis, the deep-learning algorithm, the artificial intelligence platform, and the risk-based analysis is executed on a cloud-computing platform.

In yet another embodiment of the system, the cloud-computing platform executes on information processed by at least one of an edge network and a fog network.

In yet another embodiment of the system, the system is further operable to receiving periodically a geospatial information, a driving pattern, a battery usage information, traffic information, historical information stored onto a first blockchain ledger with a first timestamp, and a personal input comprising a battery identification.

In yet another embodiment of the system, the historical information comprises at least one of a driving history, a historical weather condition, a historical battery usage information, and a historical personal input.

In yet another embodiment of the system, the driving history comprises at least one of a drive start time, a drive duration, a drive route, a destination, a starting location, and a driving tendency.

In yet another embodiment of the system, the system is further operable to: storing the real-time feature of the rechargeable energy storage battery system with a second timestamp onto a second blockchain ledger; and comparing the real-time feature of the rechargeable energy storage battery system with the second timestamp against the historical information stored onto the first blockchain ledger based on the battery identification with the first timestamp.

In yet another embodiment of the system, the system is further operable to locate a nearest charging station.

In yet another embodiment of the system, the system is further operable to locate a fully charged battery in a network nearest to the user.

In yet another embodiment of the system, the system is further operable to track and monitor a deteriorating battery in a nearest network.

In yet another embodiment of the system, the system is further operable to learn and re-adopt the energy capacity based on at least one of the driving pattern, the battery usage information, the traffic information, and the historical information.

In yet another embodiment of the system, the system is further operable to provide automatically by the smart battery management platform, at least one of a safety precaution, a disaster impact, and a disaster recovery to support a real-time decision making.

In yet another embodiment of the system, the receiving and sending occurs via a high-speed broadband internet network.

In yet another embodiment of the system, the high-speed broadband internet network comprises at least one of a 5G network and a next generation Wi-Fi network.

In an aspect, a process is described herein. The process, comprises: connecting a monitoring module and an Internet of Things (IoT) based control module of a rechargeable energy storage battery system of an electric vehicle, to a smart battery management platform and a blockchain network that includes a plurality of charging station nodes; receiving periodically by the smart battery management platform, battery related information and one or more environment factors; extracting, processing, and analyzing, the battery related information to retrieve a real-time feature of the rechargeable energy storage battery system and the one or more environment factors affecting battery life and battery performance; predicting in real-time, by the smart battery management platform, battery health and life status;

rendering using immersive technology, real-time simulated display of situational awareness; and sending a control signal to the Internet of Things based control module of the rechargeable energy storage battery system; and wherein the process is configured for managing the rechargeable energy storage battery system via one of a battery charging station and a battery service station.

In one embodiment of the process, the rechargeable energy storage battery system comprises at least one of a lithium-ion battery, a lithium iron phosphate battery, a nickel-metal hydride battery, a nickel cobalt aluminum battery, a nickel manganese cobalt battery, an iron-based battery, a sodium-ion battery, a graphene-based battery, a lead-acid battery, and an ultracapacitor.

In another embodiment of the process, the rechargeable energy storage battery system comprises a smart material-based battery.

In yet another embodiment of the process, the rechargeable energy storage battery system comprises a graphene-based battery.

In yet another embodiment of the process, the battery related information comprises at least one of a charging voltage, a discharging voltage, a current value, an insulation value, a resistance value, a power, a capacitance, an acquisition time of a battery service cycle, a battery warming characteristic and a vehicle characteristic.

In yet another embodiment of the process, the battery health and life status comprise at least one of a battery performance, a health indicator, a battery life span, an existing charge, an energy capacity, a real-time range, a remaining range and one or more battery faults of the rechargeable energy storage battery system.

In yet another embodiment of the process, the control signal comprises at least one of a temperature regulation signal, a heat regulation signal, a heat utilization signal, a self-charging signal, a cell pack switching signal and an on-off switching signal.

In yet another embodiment of the process, the monitoring module comprises a sensor array and an IoT device interface.

In yet another embodiment of the process, the sensor array comprises nanosensors.

In yet another embodiment of the process, the IoT device interface comprises one or more detectors and one or more computing processors.

In yet another embodiment of the process, the process further comprises pre-processing of information by the IoT device interface.

In yet another embodiment of the process, the monitoring module is enabled by a deep-learning algorithm.

In yet another embodiment of the process, the Internet of Things based control module comprises at least one of a smart thermal management system, smart energy management system, a charging management system, and a cell pack switching system.

In yet another embodiment of the process, the process further comprises detecting an anomaly.

In yet another embodiment of the process, the process further comprises providing on a user interface, a notification and decision-making support information.

In yet another embodiment of the process, the process further comprises detecting a failover.

In yet another embodiment of the process, the process further comprises enabling of a switchover after detecting the failover.

In yet another embodiment of the process, the process further comprises fine tuning of a charge curve of a fast-charging session using a pre-trained machine learning model.

In yet another embodiment of the process, the extracting, the predicting, the rendering and the providing automatically is performed by at least one of a statistical analysis, a deep-learning algorithm via a neural network architecture, an artificial intelligence platform, and a risk-based analysis.

In yet another embodiment of the process, the statistical analysis, the deep-learning algorithm, the artificial intelligence platform, and the risk-based analysis is executed on a cloud-computing platform.

In yet another embodiment of the process, the cloud-computing platform executes on information processed by at least one of an edge network and a fog network.

In yet another embodiment of the process, the process further comprises periodically receiving a geospatial information, a driving pattern, a battery usage information, traffic information, historical information stored onto a first blockchain ledger with a first timestamp, and a personal input comprising a battery identification.

In yet another embodiment of the process, the historical information comprises at least one of a driving history, a historical weather condition, a historical battery usage information, and a historical personal input.

In yet another embodiment of the process, the driving history comprises at least one of a drive start time, a drive duration, a drive route, a destination, a starting location, and a driving tendency.

In yet another embodiment of the process, the process further comprises: storing, by the smart battery management platform, the real-time feature of the rechargeable energy storage battery system with a second timestamp onto a second blockchain ledger; and comparing, by the smart battery management platform, the real-time feature of the rechargeable energy storage battery system with the second timestamp against the historical information stored onto the first blockchain ledger based on the battery identification and the first timestamp.

In yet another embodiment of the process, the process further comprises locating a nearest charging station.

In yet another embodiment of the process, the process further comprises locating a fully charged battery in a nearest network.

In yet another embodiment of the process, the process further comprises tracking and monitoring a deteriorating battery in a nearest network.

In yet another embodiment of the process, the process further comprises learning and re-adopting the energy capacity based on at least one of the driving pattern, the battery usage information, the traffic information, and the historical information.

In yet another embodiment of the process, the process further comprises providing automatically by the smart battery management platform, at least one of a safety precaution, a disaster impact, and a disaster recovery to support a real-time decision making.

In yet another embodiment of the process, the receiving and sending occurs via a high-speed broadband internet network.

In yet another embodiment of the process, the high-speed broadband internet network comprises at least one of a 5G network and a next generation Wi-Fi network.

In an aspect, a method is described herein. The method, comprises: connecting a monitoring module and an Internet of Things (IoT) based control module of a rechargeable energy storage battery system of an electric vehicle to a smart battery management platform and a blockchain network that includes a plurality of charging station nodes; sending periodically by the monitoring module, battery related information and one or more environment factors; and receiving a control signal to the Internet of Things based control module of the rechargeable energy storage battery system from the smart battery management platform; and wherein the process is configured for managing the rechargeable energy storage battery system of the electric vehicle.

In one embodiment of the method, the rechargeable energy storage battery system comprises at least one of a lithium-ion battery, a lithium iron phosphate battery, a nickel-metal hydride battery, a nickel cobalt aluminum battery, a nickel manganese cobalt battery, an iron-based battery, a sodium-ion battery, a graphene-based battery, a lead-acid battery, and an ultracapacitor.

In another embodiment of the process, the rechargeable energy storage battery system is a smart material-based battery.

In yet another embodiment of the method, the rechargeable energy storage battery system is a graphene-based battery.

In yet another embodiment of the method, the battery related information comprises at least one of a charging voltage, a discharging voltage, a current value, an insulation value, a resistance value, a power, a capacitance, an acquisition time of a battery service cycle, a battery warming characteristic and a vehicle characteristic.

In yet another embodiment of the method, the control signal comprises at least one of a temperature regulation signal, a heat regulation signal, a heat utilization signal, a self-charging signal, a cell pack switching signal and an on-off switching signal.

In yet another embodiment of the method, the monitoring module comprises a sensor array and an IoT device interface.

In yet another embodiment of the method, the sensor array comprises nanosensors.

In yet another embodiment of the method, the IoT device interface comprises one or more detectors and one or more computing processors.

In yet another embodiment of the method, the method further comprises pre-processing of information by the IoT device interface.

In yet another embodiment of the method, the Internet of Things based control module comprises at least one of a smart thermal management system, smart energy management system, a charging management system, and a cell pack switching system.

In yet another embodiment of the method, the method further comprises periodically sending a geospatial information, a driving pattern, a battery usage information, traffic information, historical information stored onto a first blockchain ledger with a first timestamp, and a personal input comprising a battery identification.

In yet another embodiment of the method, the historical information comprises at least one of a driving history, a historical weather condition, a historical battery usage information, a historical personal input.

In yet another embodiment of the method, the driving history comprises at least one of a drive start time, a drive duration, a drive route, a destination, a starting location, and a driving tendency.

In yet another embodiment of the method, the method further comprises: storing, by the smart battery management platform, a real-time feature of the rechargeable energy storage battery system with a second timestamp onto a second blockchain ledger; and comparing, by the smart battery management platform, the real-time feature of the rechargeable energy storage battery system with the second timestamp against the historical information stored onto the first blockchain ledger based on the battery identification and the first timestamp.

In yet another embodiment of the method, the method further comprises locating a nearest charging station.

In yet another embodiment of the method, the method further comprises locating a fully charged battery in a nearest network.

In yet another embodiment of the method, the method further comprises tracking and monitoring a deteriorating battery in a nearest network.

In yet another embodiment of the method, the smart battery management platform executes on a cloud computing platform.

In yet another embodiment of the method, the receiving and sending occurs via a high-speed broadband internet network.

In yet another embodiment of the method, the high-speed broadband internet network comprises a 5G network and a next generation Wi-Fi network.

In an aspect, a non-transitory computer readable medium is described herein. The non-transitory computer readable medium comprises instructions, that when read by a processor, cause the processor to perform: connecting a monitoring module and an Internet of Things (IoT) based control module of a rechargeable energy storage battery system of an electric vehicle to a smart battery management platform and a blockchain network that includes a plurality of charging station nodes; receiving periodically by the smart battery management platform, battery related information from the rechargeable energy storage battery system and one or more environment factors; extracting, processing, and analyzing, the battery related information to retrieve a real-time feature of the rechargeable energy storage battery system and the one or more environment factors that affect battery life and battery performance; predicting in real-time, by the smart battery management platform, battery health and life status by the smart battery management platform; rendering using immersive technology, real-time simulated display of situational awareness by the smart battery management platform; and sending a control signal to the Internet of Things based control module of the rechargeable energy storage battery system by the smart battery management platform.

BRIEF DESCRIPTION OF THE FIGURES

In the present disclosure, reference is made to the accompanying drawings, which form a part hereof. In the drawings, similar symbols typically identify similar components, unless context dictates otherwise. Various embodiments described in the detailed description, and drawings, are illustrative and not meant to be limiting. Other embodiments may be used, and other changes may be made, without departing from the spirit or scope of the subject matter presented herein. It will be understood that the aspects of the present disclosure, as generally described herein, and illustrated in the Figures, can be arranged, substituted, combined, separated, and designed in a wide variety of different configurations, all of which are contemplated herein. The embodiments are illustrated by way of example and not limitation in the figures of the accompanying drawings, in which like-references indicate similar elements and in which.

DETAILED DESCRIPTION

Definitions and General Techniques

Figure 1:
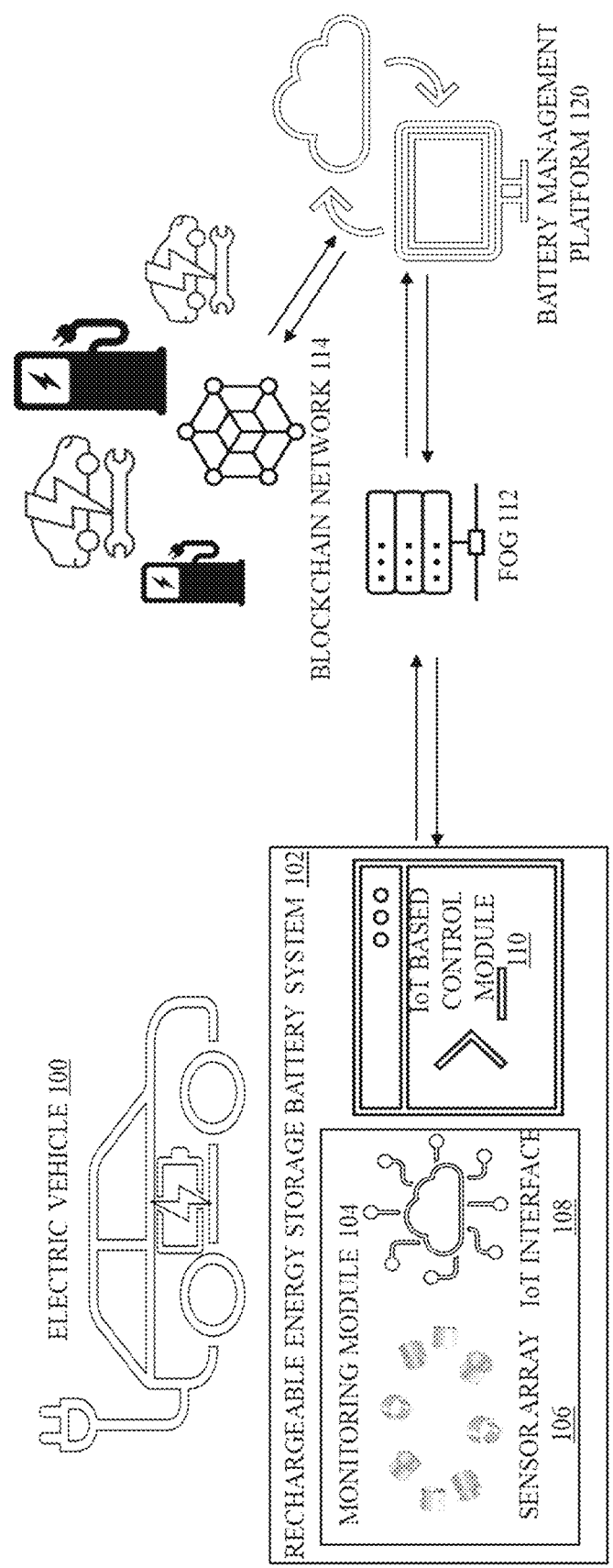
FIG. 1 depicts a block diagram of a smart battery system, in one or more embodiments.

For simplicity and clarity of illustration, the drawing figures illustrate the general infrastructure, and descriptions and details of well-known features and techniques may be omitted to avoid unnecessarily obscuring the present disclosure. The dimensions of some of the elements in the figures may be exaggerated relative to other elements to help improve understanding of embodiments of the present disclosure. The same reference numeral in different figures denotes the same element.

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth. It is also to be understood that the terminology used herein is for the purpose of describing particular embodiments and is not intended to be limiting. Unless defined otherwise, all technical and scientific terms used herein have the same meaning as commonly understood by one with ordinary skill in the art to which this disclosure belongs.

The terms "first", "second", "third", and the like in the description and in the claims, if any, are used for distinguishing between similar elements and not necessarily for describing a particular sequence or chronological order. It is to be understood that the terms so used are interchangeable under appropriate circumstances such that the embodiments described herein are, for example, capable of operation in sequences other than those illustrated or otherwise described herein. Furthermore, the terms "include", and "have", and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

No element, act, or instruction used herein should be construed as critical or essential unless explicitly described as such. Also, as used herein, the articles "a" and "an" are intended to include items and may be used interchangeably with "one or more". In addition, it will be appreciated that the various operations, processes, and methods disclosed herein may be embodied in a non-transitory machine-readable medium, and/or a system. Accordingly, the specification and drawings are to be regarded in an illustrative rather than a restrictive sense.

As used herein, the term component is intended to be broadly construed as hardware, firmware, and/or a combination of hardware and software.

As defined herein, "real-time" can, in some embodiments, be defined with respect to operations carried out as soon as practically possible. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

The present invention may be embodied in other forms without departing from its spirit or characteristics. The described embodiments are to be considered in all respects only as illustrative and not restrictive. The scope of the invention is, therefore, indicated by the appended claims rather than by the foregoing description. All variations which come within the meaning and range of equivalency of the claims are to be embraced within their scope.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products i.e., one or more modules of computer program instructions encoded on a computer-readable medium for execution by, or to control the operation of, data processing apparatus. The computer-readable medium may be a machine-readable storage device, a machine-readable storage substrate, a memory device, a composition of matter affecting a machine-readable propagated signal, or a combination of one or more of them. The term "computing system" encompasses all apparatus, devices, and machines for processing data, including by way of example, a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal) containing encoded information.

The hardware or software code used to implement these systems and/or methods is not limiting of the implementations. Thus, the operation and behavior of the systems and/or methods described herein, without reference to specific software code, is not intended to be limiting. It being understood that any software and any hardware can be designed to implement the systems and/or methods described herein.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, for example, without limitation, a Field Programmable Gate Array (FPGA), an Application Specific Integrated Circuit (ASIC), Application Specific Standard Products (ASSPs), System-On-a-Chip (SOC) systems, Complex Programmable Logic Devices (CPLDs), etc.

Processors suitable for the execution of a computer program include, by way of example, both general and special purpose microprocessors, and any one or more processors of any appropriate kind of digital computer. Generally, a processor will receive instructions and data from a read-only memory or a random-access memory or both. Elements of a computer can include a processor for performing instructions and one or more memory devices for storing instructions and data. Generally, a computer may also include, or be operatively coupled to, receiving data, transferring data or both to/from one or more mass storage devices for storing data e.g., magnetic disks, magneto optical disks, optical disks, or solid-state disks. Moreover, a computer may be embedded in, or operatively coupled to, another device, e.g., a mobile telephone, a personal digital assistant (PDA), a mobile audio player, a Global Positioning System (GPS) receiver, etc. Computer-readable media suitable for storing computer program instructions and data include all forms of non-volatile memory, media and memory devices, including, by way of example, semiconductor memory devices (e.g., Erasable Programmable Read-Only Memory (EPROM), Electronically Erasable Programmable Read-Only Memory (EEPROM), and flash memory devices), magnetic disks (e.g., internal hard disks or removable disks), magneto optical disks (e.g. Compact Disc Read-Only Memory (CD ROM) disks, Digital Versatile Disk-Read-Only Memory (DVD-ROM) disks) and solid-state disks). The processor and the memory may be supplemented by, or incorporated in, special purpose logic circuitry.

To provide for interaction with a user, implementations may be realized on a computer having a display device, e.g., a Cathode Ray Tube (CRT) or Liquid Crystal Display (LCD) monitor, for displaying information to the user, and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back-end component, e.g., a data server, or that includes a middleware component, e.g., an application server, or that includes a front-end component, e.g., a client computer having a graphical user interface or a Web browser through which a user may interact with an implementation, or any appropriate combination of one or more such back-end, middleware, or front-end components. The components of the system may be interconnected by any appropriate form or medium of digital data communication, e.g., a communication network. Examples of communication networks include a Local Area Network (LAN) and a Wide Area Network (WAN), e.g., Intranet and Internet.

The computing system may include clients and servers. A client and server are generally remote from each other and typically interact through a communication network. The relationship of the client and server arises by virtue of computer programs running on the respective computers and having a client-server relationship to each other.

Embodiments of the present invention may comprise or utilize a special purpose or general-purpose computer including computer hardware. Embodiments within the scope of the present invention may also include physical and other computer-readable media for carrying or storing computer-executable instructions and/or data structures. Such computer-readable media can be any media that can be accessed by a general purpose or special purpose computer system. Computer-readable media that store computer-executable instructions are physical storage media. Computer-readable media that carry computer-executable instructions are transmission media. Thus, by way of example and not limitation, embodiments of the invention can comprise at least two distinctly different kinds of computer-readable media: physical computer-readable storage media and transmission computer-readable media.

Although the present embodiments have been described with reference to specific example embodiments, it will be evident that various modifications and changes may be made to these embodiments without departing from the broader spirit and scope of the various embodiments. For example, the various devices, units, and modules described herein may be enabled and operated using hardware circuitry (e.g., Complementary Metal Oxide Semiconductor (CMOS) based logic circuitry)), firmware, software (e.g., embodied in a non-transitory machine-readable medium), or any combination of hardware, firmware, and software. For example, the various electrical structures and methods may be embodied using transistors, logic gates, and electrical circuits (e.g., Application Specific Integrated Circuit (ASIC) and/or Digital Signal Processor (DSP) circuit).

In addition, it will be appreciated that the various operations, processes, and methods disclosed herein may be embodied in a non-transitory machine-readable medium and/or a system. Accordingly, the specification and drawings are to be regarded in an illustrative rather than a restrictive sense.

Physical computer-readable storage media includes RAM, ROM, EEPROM, CD-ROM or other optical disk storage (such as CDs, DVDs, etc.), magnetic disk storage or other magnetic storage devices, solid-state disks or any other medium used to store desired program code means in the form of computer-executable instructions or data structures which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures, and which can be accessed by a general purpose or special purpose computer. Combinations of the above, that enable the transport of electronic data between computer systems and/or modules and/or other electronic devices, are also included within the scope of computer-readable media.

As used herein, the term "API" stands for Application Programming Interface. It is an interface that defines interactions between multiple software applications or mixed hardware-software intermediaries. It defines the kinds of calls or requests that can be made, how to make them, the data formats that should be used, the conventions to follow, etc. It can also provide extension mechanisms so that users can extend existing functionality in various ways and to varying degrees. An API can be entirely custom, specific to a component, or designed based on an industry-standard to ensure interoperability. Through information hiding, APIs enable modularity, allowing users to use the interface independently of the implementation. Web APIs are now the most common meaning of the term API. There are also APIs for programming languages, software libraries, computer operating systems, and computer hardware.

The APIs may be dynamically derived by the network. In other implementations, the APIs may be derived from API records that are stored by the network. Additionally, when new APIs are derived for a particular network service, the APIs may be recorded in case a similar network service request (e.g., from another user) is received, in which case the record may be promptly used to determine the appropriate API, or set of APIs, for the requested network service.

The API request (e.g., for a name, an ID, or another type of information in the request) may correspond to network interactions, communications, events, etc., that are to occur in order to provide the network service. The chain of network interactions, communications, events, etc., may be stored in libraries/repositories of the Software Defined Networking (SDN). APIs may be derived based on the characteristics of each of the interactions, communications, events, etc., being mapped to characteristics of APIs (also stored in libraries/repositories of the SDN architecture). As used herein, the term "Cryptographic protocol" is also known as security protocol or encryption protocol. It is an abstract or concrete protocol that performs a security-related function and applies cryptographic methods often as sequences of cryptographic primitives. A protocol describes how the algorithms should be used. A sufficiently detailed protocol includes details about data structures and representations, at which point it can be used to implement multiple, interoperable versions of a program.

Cryptographic protocols are widely used for secure application-level data transport. A cryptographic protocol usually incorporates at least some of these aspects: key agreement or establishment, entity authentication, symmetric encryption, and message authentication material construction, secured application-level data transport, non-repudiation methods, secret sharing methods, and secure multi-party computation.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface card or module (NIC), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binary, intermediate format instructions such as assembly language, or even source code. Although the subject matter has been described in language specific to structural features and/or methodological acts, it is to be understood that the subject matter defined in the claims is not necessarily limited to the described features or described acts. Rather, the described features and acts are disclosed as example forms of implementing the claims.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination or in a single implementation. Conversely, various features that are described in the context of a single implementation may also be implemented in multiple implementations separately or in any suitable subcombination. Moreover, although features may be described as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order to achieve desired results, this should not be understood as requiring that such operations be performed in the particular order shown or in sequential order or that all illustrated operations be performed, to achieve desirable results. In certain circumstances, multitasking and parallel processing may be advantageous. Moreover, the separation of various system components in the implementations should not be understood as requiring such separation in all implementations, and it should be understood that the described program components and systems may generally be integrated together in a single software product or packaged into multiple software products.

Even though particular combinations of features are recited in the claims and/or disclosed in the specification, these combinations are not intended to limit the disclosure of possible implementations. For example, the actions recited in the claims may be performed in a different order and still achieve desirable results. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Further, the methods may be practiced by a computer system including one or more processors and computer-readable media such as computer memory. In particular, the computer memory may store computer-executable instructions that when executed by one or more processors cause various functions to be performed such as the acts recited in the embodiments.

The disclosure provides illustration and description but is not intended to be exhaustive or to limit the implementations to the precise form disclosed. Modifications and variations are possible and may be acquired from practice of the implementations.

In order to fully understand the scope of the invention, the following terms used herein are defined below.

As referred herein, an "autonomous vehicle" is a vehicle that can sense its environment and moving safely with little or no human input. An autonomous vehicle may operate in a mode selected from among an autonomous mode, a manual mode, and a remote-control mode. The autonomous mode indicates operation without control of a driver, the manual mode indicates operation in accordance with a control input of the driver, and the remote-control mode indicates remotely controlled operation by an external device.

As referred herein, "battery" is a device consisting of one or more cells whose chemical reactions create a flow of electrons in a circuit. All batteries are made up of three basic components: an anode and a cathode (electrodes), and electrolyte (a chemical compound that dissociates into ions).

As used herein, "cell" refers to a basic electrochemical unit that contains the electrodes and electrolyte. Electrodes are composed of an anode and a cathode separated by electrolyte used to achieve voltage and current. In an embodiment, a cell may contain a separator.

As used herein, "anode" designates the negative electrode where oxidation is taking place during the discharge cycle while the other electrode or the cathode is the positive electrode.

As used herein, "cathode" designates the positive electrode where reduction happens during the discharge cycle while the other electrode or the anode is the negative electrode.

As used herein, "electrolyte" is the medium in the solid state that provides the ion transport mechanism between the cathode and anode of a cell.

As used herein, "solid state electrolyte" is a type of smart material electrolyte which retains its boundaries without support. The electrolyte in a solid state is called a solid electrolyte. Solid electrolytes have less contact resistance but offer low conductivity.

As used herein, "Battery life" is the amount of time a device runs before it needs to be recharged. It also indicates the amount of time a battery lasts until it needs to be replaced. It also relates to its "chemical age," which is more than just the passage of time. It includes different factors, such as the number of charge cycles and how it was cared for, etc. Battery life can be quantified in several ways: as run time on a full charge, as estimated by a manufacturer in milliampere hours, or as the number of charge cycles until the end of useful life. Build factors that affect battery life include the type, the number and the quality of cells used. Battery health and longevity decline further into a battery's life and as a function of the number of charge cycles it has gone through. However, there are several things a user can do to extend battery life.

As referred herein, "cloud service" is the on-demand availability of computer system resources, especially data storage and computing power, without direct active management by the user.

As referred herein, "Artificial Intelligence (AI) engine" comprises several fundamental modules which include a Machine Learning (ML) module, a Natural Language Processing (NLP) module and a Knowledge Representation (Ontology) module which chooses from a library of algorithms to use when automatically assembling and building different learning topologies to solve different concepts making up a resulting AI model.

As referred herein, "fog network" is an architecture that uses edge devices to carry out a substantial amount of computation, storage, and communication locally and routed over the Internet backbone. Fog computing, also called Edge Computing, is intended for distributed computing where numerous "peripheral" devices connect to a cloud. (The word "fog" suggests a cloud's periphery or edge). The fog network regulates which information and what amount of data should be sent to the cloud platform and which data can be processed locally.

As referred herein, "edge network" refers to a distributed computing paradigm which brings data storage and computation as close to the point of need as possible, pushing applications, data, and computing power away from centralized data centers. This reduces the volumes of data that is to be moved, the consequent traffic, and the distance the data travels, providing lower latency and reduced transmission costs.

As referred herein, "cloud-computing platform" refers to the use of remote public or private computing resources—known as the cloud—to process and analyze data on demand. Cloud computing analytics helps streamline the process of gathering, integrating, analyzing, and presenting insights to enhance situational awareness and decision making.

As referred herein, "high-speed broadband internet network" refers to a high-speed, higher bandwidth connection to the Internet without a need for wired connection. The greater bandwidth of a broadband connection allows for more data to be transmitted at higher speeds than a conventional telephone line or other wireless modes of data transfer. The high-speed broadband internet network comprises a 5G network and a next generation Wi-Fi network.

As referred herein, "Internet of Things" (IoT) are an inter-networking of physical devices, controllers, and other items embedded with electronics, software, sensors, actuators, and network connectivity that enable these objects to collect and exchange data and interact with a communications network like the Internet, etc. connected to a high-performance IoT Network. The IoT network is a collection of interconnected devices that communicate with other devices in the system without the need for human involvement. A network of physical objects—"things" or objects— that are embedded with nanosensors, software, and edge-computing technologies for the purpose of connecting and exchanging sensory data with other devices and systems over the Internet. In 2013, the Global Standards Initiative on the Internet of Things (IoT-GSI) defined the IoT as "an infrastructure of an information society." The IoT allows objects to be sensed or controlled remotely across existing network infrastructure, creating opportunities for more direct integration of the physical world into computer-based systems, and resulting in improved efficiency, accuracy, and economic benefit in addition to reduced human intervention.

In one embodiment, the IoT based control system of a plurality of smart rechargeable energy storage devices, is provided.

As referred herein, "blockchain" is designed to manage a growing list of records called blocks which are interconnected by utilizing cryptography (the art of writing or solving codes). Each block contains a cryptographic hash of the previous block, a time stamp, and exchange information. A blockchain is a decentralized and distributed digital ledger consisting of records called blocks that is used to record transactions across the distributed network so that any involved block cannot be altered retroactively, without the alteration of all subsequent blocks. In addition to the ensured accuracy of records, such a procedure also provides an exceptionally traceable audit trail. Security is viewed as one of the advantages of a blockchain. It is difficult to corrupt a blockchain record because data is shared across the network, and blockchain has no single point of failure. If one node goes down, it is not a problem since the various nodes have a duplicate of the ledger. A blockchain has been described as a value-exchange protocol. A blockchain maintains title rights and is designed to be properly set up to detail the exchange agreement.

As referred herein, "immersive virtual environment technology or immersive technology" refers to software and hardware systems that allow users to replace or expand physical environments to get more information than real surroundings can offer. These technologies include Virtual Reality (VR), Augmented Reality (AR), and mixed reality (MR). While augmented reality superimposes the existing environment with the additional layer of content, VR implies the complete replacement of the physical surrounding with the virtual one. On the other hand, MR forms another separate layer of content within the existing environment.

As referred herein, "integrated circuit" or IC or a chip, or a microchip is a set of electronic circuits on one small flat piece. An integrated circuit or monolithic integrated circuit is a set of electronic circuits on one small flat piece of semiconductor material that is normally silicon based. In traditional transistors, silicon acts as a thin conducting channel, the conductivity of which can be tuned with applied voltage.

As used herein, "weather information" refers to current weather conditions, past weather conditions, historical weather conditions, weather forecast, temperature, precipitation, visibility, and combinations thereof.

As referred herein, "geospatial analysis" is the gathering, display, and monitoring of the smart energy devices and its generated historical data, described explicitly in terms of geographic coordinates. It is a method of applying statistical analysis and deep-learning techniques to known data which has a geographical or spatial aspect.

As used herein, "historical information" refers to information that is based on past conditions, such as when a user has previously used a vehicle, where the vehicle has been driven and at what performance levels the vehicle has been driven. Other examples of historical information relate to historical conditions such as traffic conditions, weather conditions, etc. Historical information may be binned and analyzed in any appropriate way including annually, monthly, weekly, and daily/hourly.

As used herein, the phrase "drive pattern" refers to the location, and velocity-related conditions associated with the drive, such as start location, end location, route taken, power level needed to drive at relevant velocities (e.g., power levels for minimum safe driving, urban driving, highway driving, enthusiast driving, etc.), GPS information and geography of the route, traffic information during expected time of the drive, availability of charging equipment at the beginning and end of drive, and other related metrics.

As used herein, the phrase "feedback" comprises any appropriate form of control feedback based on a comparison of the predicted level of heating or performance to the actual level of heating or performance and optionally an adjustment of the system so that the subsequent predictions better match the actual levels. In various embodiments, machine learning techniques may be applied to carry out this comparison and improve future predictions.

As referred herein, "input/output operations per second (IOPS)" is the standard unit of measurement for the maximum number of reads and writes to non-contiguous storage locations.

As referred herein, "Original Equipment Manufacturer (OEM)" is defined as a company whose goods are used as components in the products of another company, which then sells the finished item to users.

As referred herein, "RAdio Frequency IDentificatioN (RAIN/RFID)" is a passive (battery-free) wireless technology that connects devices with Ultra-high frequency RAdio Frequency IDentificatioN (UHF RFID) tags to the cloud/internet. This technology connects the UHF RFID devices to the cloud, so that RFID-based data can be stored, managed, and shared via the Internet. A RAIN RFID solution comprises tags, readers, and software. It uses a reader to read and write a tagged item, manage the data, and transmit it to a server (local or in the cloud). As referred herein, "connectivity network" is describing the extensive process of connecting various parts of a network to one another.

As referred herein, "data processing unit" is a programmable electronic component that processes streams of data.

As referred herein, "user interface" (UI) is the point of human-computer interaction and communication in a device. User interface examples are computers, tablets, mobile devices, and smartphones.

As referred herein, "rechargeable energy storage device" is a device which can be charged, discharged into a load, and recharged several times. Each rechargeable battery cell is composed of positive electrodes also known as cathodes and negative electrodes, known as anodes. The term anode designates the negative electrode where oxidation is taking place during the discharge cycle while the other electrode or the cathode is the positive electrode. During the charge cycle, the positive electrode becomes the anode, and the negative electrode becomes the cathode. For example: for most lithium-ion (Li-ion) cells, the lithium-oxide electrode is the positive electrode, and a sponge-like lithium material is composed of the negative electrode.

As referred herein, "smart thermal management system (STMS)" is a system that manages temperature which allows for both cooling and self-heating, based on external temperature changes, keeping the internal temperature regulated and promoting fast charging.

As referred herein, "smart energy management system (SEMS)" is a system to regulate, manage and decrease the energy consumption and thereby increase the battery life through an optimal distribution of the energy. The SEMS determines an optimal energy flow by analyzing all environmental data to achieve the demanded vehicle speed, internal cabin heating/cooling needs, etc.

As referred herein, "sensor" is a device, module, machine, or subsystem whose purpose is to detect events or changes in its environment and send the information to other electronics, frequently a computer processor. A sensor is used with other electronics. A sensor could be a biosensor, a chemical sensor such as a gas sensor, a heat sensor, a multi-functional sensor, etc. A multifunctional sensor may have potential of both chemical and biosensor.

As referred herein, "biosensor" is an analytical device, used for the detection of a chemical substance, that combines a biological component with a physicochemical detector.

As referred herein, "heat sensor" is an electronic device that measures the temperature of its environment and converts the input data into electronic data.

As referred herein, "sensor array" is defined as a group of sensors, usually deployed in a certain geometry pattern, used for collecting and processing electromagnetic or acoustic signals and converting them into real-time data for the Artificial Intelligence (AI) Engine to collect, curate, process and analyze the data to derive predictive analytics and support deep learning using the two-dimensional recurrent neural network (RNNs).

As referred herein, "geolocation" is the process of finding, determining, and providing the exact location of a given device. It is used to identify the location of a given device based on geographical coordinates and measurements. Geolocation is dependent on Global Positioning System (GPS) technologies to assess and specify geographical locations. The reference to geospatial is used to indicate the use of geospatial analysis using known geographic and GIS datasets and specifically locational information tied to them such as geographic data in the form of coordinates, GIS data, GPS data, satellite imagery, and geotagging.

As referred herein, "microprocessor" is a multi-purpose, programmable device that accepts digital data as input, processes it according to instructions stored in its memory, and provides results as output. The speed or fastness of microprocessors are determined by the number of transistors that are packed in them. Microprocessors today can easily pack more than 150 billion transistors in each square millimeter of chip.

As referred herein, "active material" is the materials of the plates that react chemically to produce electric energy when the cell discharges and that are restored to their original composition, in the charged condition, by oxidation and reduction processes produced by the charging current. In an embodiment, all active materials are to be in the Solid State.

As referred herein, "microelectronics" relates to the field of microfabrication of extremely small electronic designs which are made from semiconductor materials and include transistors, capacitors, inductors, resistors, diodes and particularly insulators and conductors. The field continues to expand as demand for smaller and less expensive devices grows. Key requirements for the deposition methods are atomic level accuracy in thickness control, uniformity over the increasing wafer sizes and conformality over the increasingly complex device structures, all factors favorable for Atomic Level Deposition. The layer thicknesses have been shrinking to the nanometer level. The microelectronics and nanotechnology revolution depends on the ability to make precise structures on the nanometer-length scale. Achieving this objective will be vital in continuing the pursuit of Moore's law.

As referred herein, "smart material" is a form of modified active material capable of reacting to stimuli or the environment in a prescribed manner. Smart materials can be manipulated to respond in a controllable way, modifying some of their properties as a result of external stimuli such as certain mechanical stress or a certain temperature, among others. Because of their responsiveness, smart materials are also known as highly responsive and predictive materials. A smart material may refer to material that is predictable and capable of being controlled such that its response and property change are as expected and as desired under a stimulus. Smart materials are utilized as sensors, biosensors, nanosensors, and mechanisms with applications at any scale. Smart materials including, but not limited to, shape memory alloys and polymers, pure carbon-based materials, electro, and magnetorheological materials, piezoelectrics, ferroelectrics, multiferroics, piezomagnetics, electro and magnetostrictive materials, thermoelectrics, photovoltaics, electro and magnetocaloric materials, electrochromics, electroactive polymers, energy storage materials, self-healing materials and multifunctional materials in general.

As referred herein, "intelligent edge processing" is a process where large amounts of data are analyzed and aggregated close to where the data is accessed and captured in the distributed network. The intelligent edge, also described as "intelligence at the edge," has important ramifications for distributed networks using IoT devices.

As referred herein, 'metaverse" refers to virtual worlds and to using immersive technologies, including the entire spectrum of augmented reality. The metaverse is a shared virtual 3D simulation that is interactive and collaborative. Metaverse is the easiest way to create augmented reality simulations to provide situational awareness on the fly enabling the EV users to make real-time changes to retain and enhance the available range and thereby ease the user's 'range anxiety'. Metaverse utilizes the substrate modular framework for higher scalability, long term expansion and support to connect decentralized applications, services and to allow other independent blockchains to connect and to exchange information.

A smart battery system for battery monitoring, control, and management (system from here) is described herein. The system utilizes a plurality of intelligent systems integrated with smart nanosensors, actuators, smart microelectronics, and nano controllers, applied to modern electric vehicles and micro electronic systems that utilize collaborative technologies to make it a smart system.

In an aspect, a system is described herein. The system comprising: a rechargeable energy storage battery system of an electric vehicle comprising a monitoring module and an Internet of Things (IoT) based control module; a blockchain network; a processor; a tangible non-transitory memory configured to communicate with the processor, wherein the tangible non-transitory memory has stored thereon instructions executable by the system to cause the system to perform operations comprising: connecting the monitoring module and an Internet of Things (IoT) based control module of the rechargeable energy storage battery system of the electric vehicle, to a smart battery management platform and a blockchain network that includes a plurality of charging station nodes; receiving periodically by the smart battery management platform, battery related information and one or more environment factors; extracting, processing, and analyzing, the battery related information to retrieve a real-time feature of the rechargeable energy storage battery system and the one or more environment factors that is affecting battery life and battery performance by the smart battery management platform; predicting in real-time, by the smart battery management platform, battery health and life status by the smart battery management platform; rendering using immersive technology, real-time simulated display of situational awareness by the smart battery management platform; and sending a control signal to the IoT based control module of the rechargeable energy storage battery system by the smart battery management platform.

FIG. 1 depicts a block diagram of the system for battery monitoring, control, and management in one or more embodiments. The system comprises a rechargeable energy storage battery system 102 (battery from here) comprising a monitoring module 104, and an Internet of Things (IoT) based control module 110; a blockchain network 114 and an Artificial Intelligence and Machine Learning (AIML) based smart battery management platform 120 that executes in the cloud. In an embodiment, the monitoring module 104 comprises a sensor array 106 and an IoT device interface 108. The IoT device interface comprises one or more detectors and one or more computing processors. In an embodiment the rechargeable energy storage battery system is used by the electric vehicle 100. In another embodiment, the smart battery management platform executes on information processed by a fog network. The Internet of Things (IoT) based control module 110 comprises at least one of a smart thermal management system, smart energy management system, a charging management system, and a cell pack switching system. The system can enable data driven computation of precise real-time energy capacity and real-time range. It can recognize anomalies and provides thermal protection and thermal management for optimal cell pack health conditions. The system can self-learn to enable optimal cell pack self-heating functions and can self-regulate cell pack temperature thereby encouraging fast and safe charging. The system via thermal protectors can regulate current flow to cell packs during unsafe thermal conditions thereby equilibrating cell packs. The system can fine-tune the charge curve of any fast-charging session using a pre-trained machine learning model and can self-learn to enable the on-off switching to charge cell packs autonomously. The system can provide real-time situational awareness and decision-making functions via a user interface.

Figure 2A:
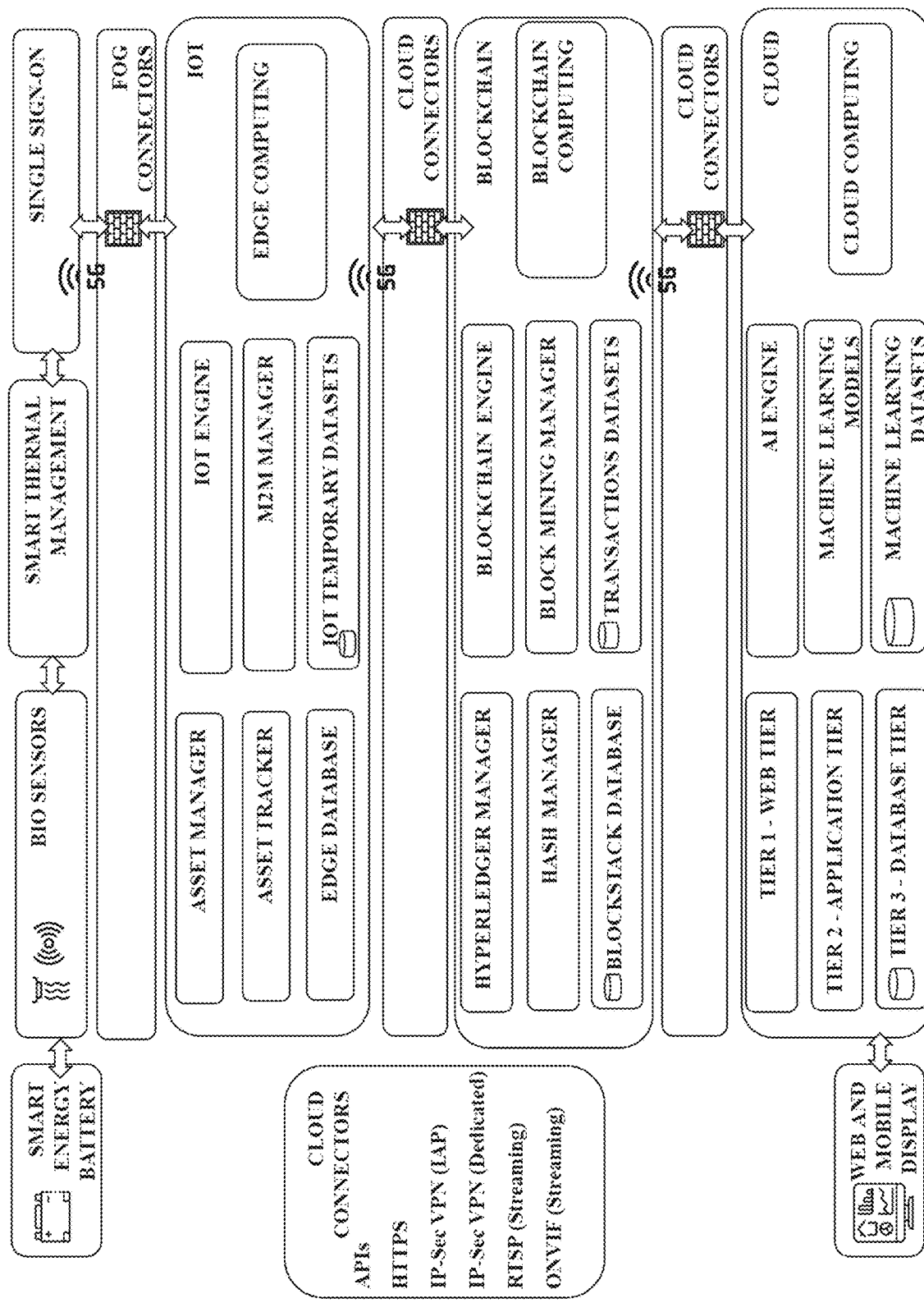
FIG. 2A provides conceptual architecture according to an embodiment.
Figure 2B:
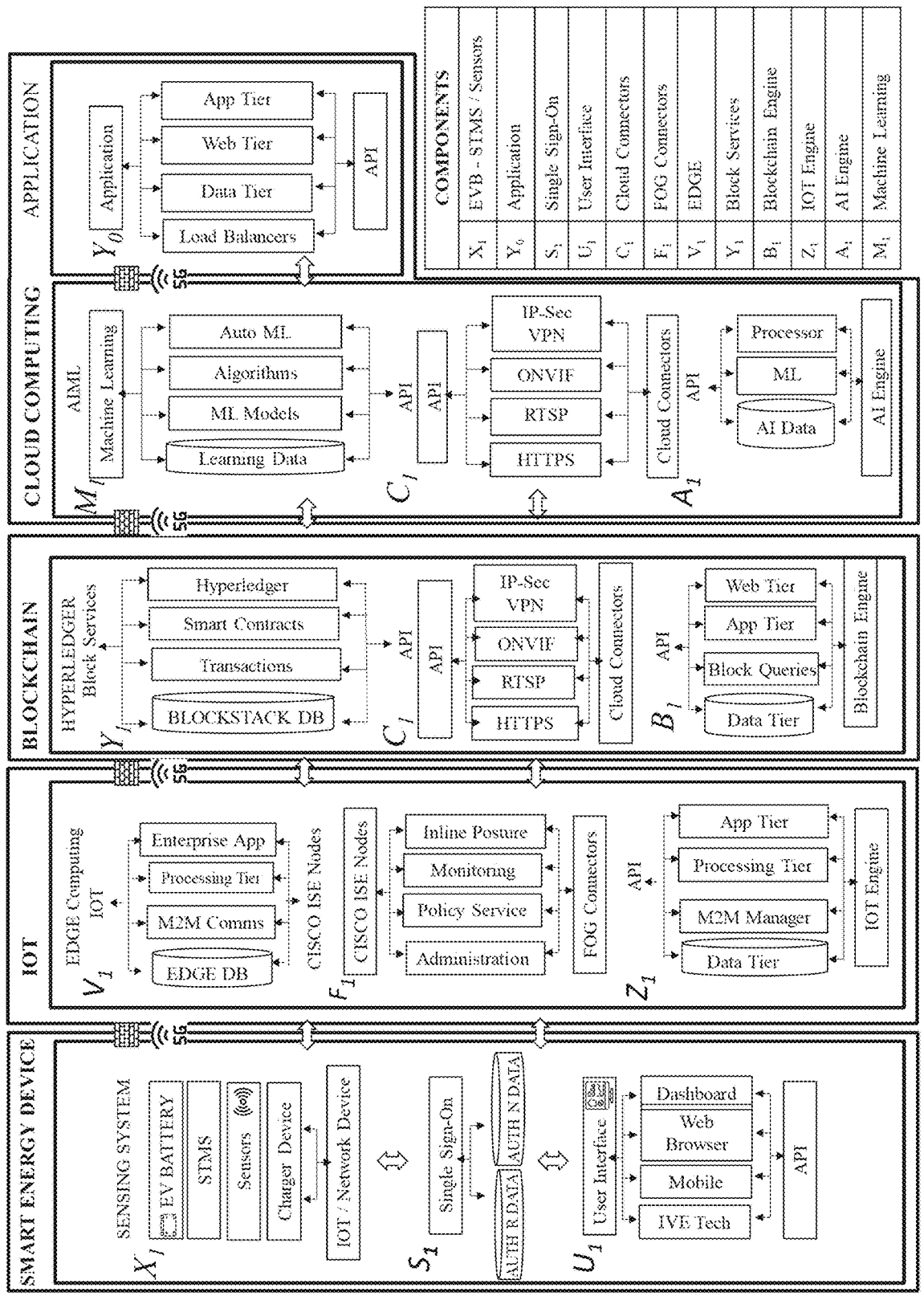
FIG. 2B provides a logical architecture of the smart battery system according to an embodiment.

FIG. 2A-2B provides a conceptual architecture and a logical architecture of the system, in one or more embodiments. In an embodiment, the system includes the following fundamental elements: (1) Nanosensors (2) Microprocessor (3) Smart Thermal Management System (STMS) (4) Cloud Services (5) AI Engine (6) IoT Framework (7) Fog Engine (8) 5G Connectivity (9) Data Processing (10) Immersive virtual environment technology (IVE) and (11) Mobile and web User Interface (UI).

FIG. 2A provides conceptual architecture and FIG. 2B provides a logical architecture of the smart battery system, in one or more embodiments. In an embodiment, the system comprises a smart energy battery, a monitoring module comprising sensor array and IoT interface, an AI engine with a cloud computing component, a blockchain component, and a smart thermal management component connected through cloud connectors and fog connectors.

In an embodiment, the cloud connectors and fog connectors may comprise APIs, HTTPS, IP-Sec VPN (TAP), IP-Sec VPN (Dedicated), Real Time Streaming Protocol (RTSP), and Open Network Video Interface Forum for streaming. The IOT interface may comprise an IOT engine, a Machine-to-Machine (M2M) communications manager, IOT temporary datasets, asset manager, asset tracker and edge database. The blockchain component may comprise blockchain computing component, blockchain engine, block mining manager, transaction datasets, hyperledger manager, hash manager and block stack database. The AI engine with a cloud computing component may comprise machine learning models, machine learning datasets, a web tier, an application tier, and a database tier. A user interface may be provided in the form of web display and mobile display. FIG. 2B shows the logical architecture of the system, in one or more embodiments.

The major smart material based nanosensors and nanosensor arrays of an electric vehicle may comprise—rotary position sensors, analog position sensors, resolver sensors, encoder sensors, micro-electro-mechanical systems (MEMS), inertial sensors, MEMS based accelerometer sensors, MEMS based sensors for skidding and rollover detection, MEMS based sensors for leaks, MEMS based sensors for air pressure, MEMS based sensors for electronic stability, MEMS based sensors for engine management, MEMS based sensors for electronic braking system, MEMS based sensors for navigation and geo-location, etc. MEMS-based sensors are used for many other subsystems like cruise control, lane discipline, parking distance, sensing objects, and others. In an example, MEMS based sensors can be used for monitoring smart rechargeable batteries. The three main measurements of the MEMS based battery monitoring sensors include—voltage, temperature and current. The battery monitoring sensors are used for health monitoring, particularly aging and state of charge operating at a higher voltage. Each cell in the cell pack is attached to a thermal measurement chip and a voltage measurement chip. The EV Battery state detection includes—State of Charge (SOC) or charge predictions, State of Function (SOF) or voltage predictions, State of Health (SOH) or cell pack and battery aging conditions. The SOC indicates a charge rate [%] of a battery and the SOH indicates a residual capacity [Ah] of a battery. The SOC constitutes the adaptable and deliverable charge and energy (overall energy capacity translated in the available range). The SOF constitutes the measurable voltage fluctuation and particularly the voltage drop if any. The SOH constitutes the measurable cell pack and battery aging conditions in relation to the historical driving conditions.

The monitoring module comprises a sensor array and an IoT device interface. The sensor array is a group of sensors, usually deployed in a certain geometry pattern. The sensor array may comprise heat sensor, motion sensor, light sensor, pressure sensor, smell sensor, smoke sensor, moisture sensor, current sensor, voltage sensor, temperature sensor, tilt sensor, accelerometers, shock sensor, vehicle speed sensor, engine speed sensor, thermistor, and a thermocouple. The sensor array collects data including data relevant to evaluating the health of a vehicle battery and may pre-process the information (e.g., by normalizing the information, removing statistical outliers, etc.) to generate a data set that describes the current status and conditions relating to the battery before sending to the smart battery management platform embedded in the cloud via a fog network.

The system provides an IOT based smart network solution to send sensory data to the intelligent edge and fog services and then to the cloud service to be transformed using the Artificial Intelligence and Machine Learning (AIML) framework (that particularly includes evolutionary based artificial neural network (ANN) algorithms, recurrent neural network (RNN) based algorithms, and Deep Learning (DL) models)

into intelligent information to be delivered to an end user in real-time via the user interface.

In an embodiment, the smart system would rely on the Linear Variable Differential Transformer (LVDT) sensors to measure pouch and prismatic cell swelling during high stress conditions. This detection helps regression analysis resulting in corrective action. This ensures the durability of each cell and the overall battery housing.

In an embodiment, smoke or gas concentration can be detected by measuring the resistance change of Metal Oxide Semiconductor (MOS)-type gas sensors. The chemical reaction of gases and absorbed oxygen on a given surface would vary depending on the reactivity of sensing materials and working temperature of the sensor. When the combination of sensors is exposed to combustible inorganic gases (carbon monoxide or $CO_2$) and even hydrocarbons, the oxidation reaction of such gas with absorbed oxygen occurs at the surface. Many gases when mixed in a certain proportion with an oxidant, normally air, will ignite. So flammable gas detectors are calibrated for the flammable gas hazard in question and measured in the region from no gas (zero) to the point where the gas is just flammable, or 100% Lower Explosive Limit (LEL). Gas detectors are scaled to read from 0 to 100% LEL. For example: 10% LEL indicates that the gas is about 10% of the way to being flammable, 50% LEL and its halfway to being flammable.

In an embodiment, a highly sensitive aspirating smoke detector, a gas sensor and a microwave radiometer may be supported using deep learning through the use of evolutionary based two-dimensional RNN and ANN based algorithms. The AIML framework as part of this invention relies on machine learning algorithms such as classification, non-linear regression, and clustering. ANNs using RNNs are capable of rapidly extracting features from given input data which supersedes, is faster than manually designed features and manually written code. Therefore, the deep Learning techniques are characterized by 'Deep Unsupervised Adaptive Learning' (DUAL) where the smart sensing systems teach themselves the ability to build, improve, and learn on their own and implicitly optimize their outputs in real-time. Therefore, in ANN based RNNs—it is the "recurrent" part that makes RNNs smarter, in that their unique ability to continuously improve upon their internal models based on extracting features from external structured and external unstructured data.

In an embodiment, MOS-type gas sensors can be used for smoke and gas detection. The process for gas and smoke detection comprises a) Gas and smoke detection and recording, b) Sensing and identification of the gas data, c) Creation of a 2D gas database d) Normalization of data, e) Use of artificial intelligence for pattern recognition, f) Predictive analysis using deep learning.

In an embodiment, the MOS-type gas sensor senses and identifies the gas data, records the data, analyzes the gas and smoke data, normalizes the data, and creates a 2D gas database. Intelligent edge processing is used for normalizing data, artificial intelligence is used for pattern recognition, and deep learning is used for predictive analysis.

In an embodiment, flammable gas detection can be a combination of catalytic and infra-red detectors. Present apparatus would use both detectors owing to their individual unique features and benefits. So, the catalytic detector is deemed to be an excellent first responder due to its ability to detect almost all flammable gases, and infra-red detectors may offer other advantages. An Infra-Red detector is more fail safe, as its electronics can self-check and reveal most failure conditions.

Supercapacitors store charge just like a traditional rechargeable energy storage device but can charge incredibly quickly when needed. In an embodiment, electrode designs using the smart materials will allow the smart rechargeable battery cells to charge faster which will provide large amounts of energy at a rapid rate. The smart material would evenly distribute current, and also protect the smart energy device and internal cell packs by having fire retardant properties. These smart material electrode designs enable the smart rechargeable energy storage devices to last for much longer and charge almost instantly.

In an embodiment, electrodes include smart materials in the solid state, which will allow the battery cells to charge much faster and will make the smart rechargeable energy storage devices just as fast as the speedy supercapacitors that store and provide large amounts of energy at a rapid rate.

In an embodiment, multi-terminal devices such as integrated circuits (ICs) are composed of smart materials yielding a much thinner, more sensitive channel region. The smart material-based ICs will be incorporated into the SEMS to perform quantum processing both for intelligent edge and AIML analytics simply to maintain optimal temperatures and control settings for dynamic and high-performance computing.

In an embodiment, the data collected by the monitoring module will be sent to a fog device, an intelligent edge and an AI engine using cloud service via a network solution and transformed into highly useful cognitive machine learning information.

The most common case in IoT applications is that the user receives critical situational awareness notifications or alerts on sensed and perceived imminent errors or failures, or when an off-nominal event is about to happen or occurs. For example, if the battery charge exceeds a threshold limit, a notification is provided for the same. The notification can be provided via email, short message service, phone call, or push notifications. Users might want to be able to monitor information proactively. For example, an asset tracking can track multiple smart energy storage devices installed in multiple vehicles or users might want to monitor location, and all key data points including—internal and external temperature, performance, energy capacity, health of connected parts, failover capabilities, audit logs, IOPS per second, charge available if on a non-vehicle device and range if on a vehicle.

In an embodiment, the information processed from IoT data is tailored to the user's specific needs. Also, visualization using advanced Immersive Virtual Environment (IVE) technology can be used to make the deep learning data and curated information easier to simulate, display and understand. The user interface can also allow the user to control the IoT system components remotely.

In an embodiment, the microprocessor based IoT device interface (IoT interface) is to include a reader configuration application programming interface (API) and a web and mobile based UI that each empower IoT devices to easily connect applications to configure and control devices, and to consume RAIN data. The IoT Device interface would support HTTP, HTTPS Streaming, Kafka, and MQTT as secure encrypted data output protocols using Transport Layer Security (TLS). With native support for industry-standard data formats and protocols, such as HTTP, HTTPS streaming and MQTT output, the IoT interface makes it easier to connect and scale while adding features and solutions that will integrate with IoT platforms and blockchain platforms.

In an embodiment, an IoT interface is used to network the smart component's information onto the user's own web browser, tablet, and mobile device. Data can be integrated both horizontally and vertically into data collectors or processors. This enables long-term recording and evaluation of device data, statuses, and system messages.

In an embodiment, removable cells are replaced by new ones when the cell is close to the end of its charge. This environment-friendly smart material-based dry cell can be rechargeable and safely recycled once it has been sufficiently used or is deemed to be close to the end of its life.

In an embodiment, smart material-based nanosensors will indicate when a smart cell has reached the end of its charge life so it can be recharged or replaced. The measurement known as "absolute zero" describes a state of matter where there is no movement whatsoever inside an object, even at the subatomic level. It is the coldest state of matter. As soon as an object is heated, the particles inside it start to move. The smart material-based nanosensors are to pick up on this movement and measure it, which can be translated into a temperature. All objects give off a heat signature, so a smart nanosensor is to detect when its temperature has dropped or increased, or any other changes.

In an embodiment, the rechargeable energy storage battery system can also be referred to as a smart energy device or simply smart batteries where IoT, intelligent edge, fog, cloud, Big data, AIML platforms, 5G network connectivity, blockchain, metaverse and immersive technologies are inseparable. A 5G network provides greater bandwidth resulting in higher performance and can enable handling of multiple connected IoT devices. The combination of Intelligent edge, fog edge computing and blockchain services along with the 5G network will also greatly reduce latency. The 5G network is designed to use higher-frequency radio waves in addition to the range of frequencies already used, and will work with smaller, more closely distributed wireless access points instead of large, dispersed cell towers. Shorter range radio waves and cell towers that cover smaller areas improves location tracking of the electric vehicles using the smart batteries which then opens the way for use of intelligent geolocation services with real-time traffic monitoring and opens the way for developing a smart traffic system by leveraging the 'network effort' of all the connected energy devices. This allows the EVs that have the installed smart batteries to sense and acknowledge each other's geo location. Another benefit being that EVs can be notified and be able to autonomously adjust its speed in real-time if the EV ahead suddenly reduces speed or has come to a full halt. The network effect is expected to play a key role in the advancement of the 'smart energy devices' by leveraging the combination of the IoT, intelligent edge, fog, cloud, Big data, 5G network, blockchain and AIML platforms. The described system will be designed to greatly tap 5G to boost the IoT applications, blockchain, virtual and connected network, and larger-scale AIML deployments.

In an embodiment, geospatial analysis comprises actions required to track, review, and orchestrate the progress and performance of a smart energy device. Such intelligent geographic information systems can be used to learn, analyze, and predict all kinds of phenomena affecting the users of electric vehicles, affecting the environment, affecting smart traffic systems or other such equipment. Such analysis would typically employ deep-learning models capable of geospatial representation and processing and apply analytical methods to terrestrial or geographic datasets. Geospatial analysis intelligently classifies, clusters, and filters out relevant data from the known available large datasets and applies it to conceptualize the order hidden within the apparent disorder of geographically sorted data. This will allow the AI based monitoring system to provide accurate statistical analysis, risk modeling, safety precautions and disaster impact models to support real-time decision making.

In an embodiment, IoT capabilities are to be embedded in all smart battery cells including the storage devices' housing where data streams via 5G based internet connections to the nearest one or more intelligent edge devices or fog nodes and to one or more central (Cloud) locations. All these isolated and specialized technologies are to be connected within the smart energy devices system. The smart energy devices are to be equipped with a multitude of graphene or smart material based nanosensors. With these nanosensors, the smart energy devices will collect battery related information and the environment data to constantly calculate, analyze, predict, and simulate the available capacity translated into range in terms of distance. The collected data can be as simple as a measurement of the percentage of charge available, or data containing self-charging capabilities, or performance dynamics, or internal and external temperatures; and the collected data can be as complex as a complete predictive simulation.

In an embodiment, smart energy devices will have built-in wireless network cards and 5G connectivity, so that the highly distributed intelligent edge model can be networked and connected to the Internet and can produce and exchange vast amounts of real-time data to facilitate deep learning. Billions of connected smart energy devices then would become part of the IoT network thus creating a network effort with a unique identifier becoming part of the larger blockchain based distributed digital ledger. A side effect and useful benefit of IoT leveraging intelligent edge is that all the connected smart energy devices collectively generate a huge amount of intelligent data (Big data) that continuously renders both structured and unstructured data including labeled and unlabeled data. With IoT connected smart energy devices, continuous measurements of various nanosensors can provide situational awareness and encourage intelligent decision making, allowing one to recognize dynamic trends and make real-time predictions on the fly. The expectation being that over time, using the IoT, intelligent edge and AIML, the smart energy devices will eventually use less energy, reduce the overall carbon footprint, waste fewer products, reduce the reliance on oil and acidic materials, reduce the dependency on scarce and expensive materials found in mines, reduce safety hazards, save costs, and reverse the side effects and evil perils of global warming.

In an embodiment, Big data, intelligent edge, the fog, cloud, blockchain and the IoT are all parts of a continuum. Intelligent edge processing and the Fog network rely on edge computing to provide real-time responses. Cloud computing is the structured centralized virtual and scalable environment that supports Big data projects. Cloud computing is the availability of virtual infrastructure that includes hardware, software and data storage using a highly networked and secure platform on demand. Connected to the cloud, the smart system is to be designed to efficiently store, curate, process, analyze and retrieve data in real-time remotely. These smart energy devices will run on their own embedded software or firmware and will use a high-performance intelligent edge processing, fog edge computing combined with blockchain and a high-performance AI engine on the cloud to process data and calculate predictive analytics in real-time. The data that is sent will be stored and processed within the fog network using distributed intelligent edge models first and then onto the centralized cloud, i.e., in a data center for data analysis.

Because the faster these smart energy devices generate, produce, store, curate and analyze data, the faster we get the results and the greater is the predictive value of the data to the electric vehicles and other devices that use these smart energy devices. The real value of Big data lies in the insights gained through analysis—discovered patterns, derived meanings, indicators for decisions and ultimately the ability to respond to the world of users with greater intelligence.

In an embodiment, the system would be compatible with any of the rechargeable energy storage battery systems comprising a lithium-ion battery, a lithium iron phosphate battery, a nickel-metal hydride battery, a nickel cobalt aluminum battery, a nickel manganese cobalt battery, an iron-based battery, a sodium-ion battery, a graphene-based battery, a lead-acid battery, and an ultracapacitor.

An embodiment relates to a smart and intelligent rechargeable energy storage device such as a smart rechargeable electric vehicle battery that uses an alternative composition of a form of smart material to be able to quickly charge and provide long range. The secret of the new smart energy device is the strategic combination of different complementary hybrid smart materials—hence, also referred to as 'asymmetrical'. Smart, intelligent, and flexible systems are becoming an integral part of new automobiles and microelectronics due to the extremely high performance and the potential for lightning response in real-time.

In an embodiment, the rechargeable energy storage battery system is a smart material-based battery.

In an embodiment, the rechargeable energy storage battery system is a graphene-based battery.

In an embodiment, the rechargeable energy storage battery system comprises a smart cell, wherein the smart cell comprises: a) an electrolyte comprising a material made of smart materials wherein the electrolyte is in a solid state; b) an anode electrode comprising a first material made of smart materials; c) a cathode electrode comprising a second material made of smart materials; d) a separator between the anode electrode and the cathode electrode made of smart materials, wherein said system is configured to deliver an electrical power at a rate of about 900 Wh/kg, 1800 Wh/kg, 3600 Wh/kg, 5000 Wh/kg, 7000 Wh/kg, 10000 Wh/kg, 2000 Wh/kg or more. The cells made of smart materials are to be well-integrated with a multitude of nanosensors, microelectronics and smart, intelligent, and flexible systems to deliver 900 Wh/kg and beyond. The system focus includes increasing rate capability and extending cycle life to a few thousand-fold cycles.

In an embodiment, the smart system would be configured to deliver electrical power at a rate of about 520 Wh/kg, 750 Wh/kg, 1000 Wh/kg, 1200 Wh/kg, 1500 Wh/kg, 2000 Wh/kg, 2500 Wh/kg, 5000 Wh/kg, 10000 Wh/kg or more.

In an embodiment, apparatus having smart material-based cathodes, anodes, electrolytes, and other components, all being in the solid state and supported by smart systems nearly can triple the amount of electricity that a normal EV battery such as the current Li-metal battery can deliver from about ~180 Wh/kg to ~300 Wh/kg. A higher energy-to-weight ratio is key to solving the limited range drawback that electric batteries face today.

In an embodiment, the smart material-based cell batteries that are in the solid state and supported by multitude of nanosensors, microelectronics and extremely smart systems can deliver about 1000 Wh/kg, 1500 Wh/kg, 2000 Wh/kg, 2500 Wh/kg, 3000 Wh/kg, 4000 Wh/kg, 5000 Wh/kg, 6000 Wh/kg, 7000 Wh/kg, 8000 Wh/kg, 9000 Wh/kg, 100,000 Wh/kg or more.

In an embodiment, the smart material-based batteries can deliver 2 times, 4 times, 5 times, 10 times, 20 times, 30 times, 40 times, 50 times, 100 times, 120 times, 150 times, 200 times, and 1000 times of Li-ion or Sodium-ion battery.

In an embodiment, the smart material-based cells would be able to retain close to 95 percent capacity even after 4 times charge cycles, 5 times charge cycles, 6 times charge cycles, 7 times charge cycles, 10 times charge cycles, 20 times charge cycles, 30 times charge cycles, 40 times charge cycles, 50 times charge cycles or more than the normal high capacity Li-ion cells or Sodium-ion cells and be able to support 10,000 or more charge cycles.

In an embodiment, the smart material-based cells would be able to retain close to 90 percent capacity, 92 percent capacity, 97 percent capacity, 98 percent capacity, 99 percent capacity even after four times the normal high-capacity Li-ion cells or Sodium-ion cells.

In an embodiment, the smart material-based cells can support 15,000 charge cycles, 20,000 charge cycles or more than Li-ion or Sodium-ion cells.

In an embodiment, the smart material-based cell comprises a catalyst made of smart materials to start a safe and controlled reaction between the anode electrode and the cathode electrode in the solid state of the smart material-based cell.

In an embodiment, the smart material-based cell further comprises a solid-state separator between the anode and the cathode, which is configured to act as a physical barrier between the anode and the cathode to allow the safe and smooth exchange of electrons from the anode to the cathode.

In an embodiment, the smart material-based cell comprises a separator sheet comprising a smart material in the solid state; wherein the separator sheet is configured to filter electrons passing from the cathode electrode to the anode electrode of the smart material-based cell.

Figure 3:
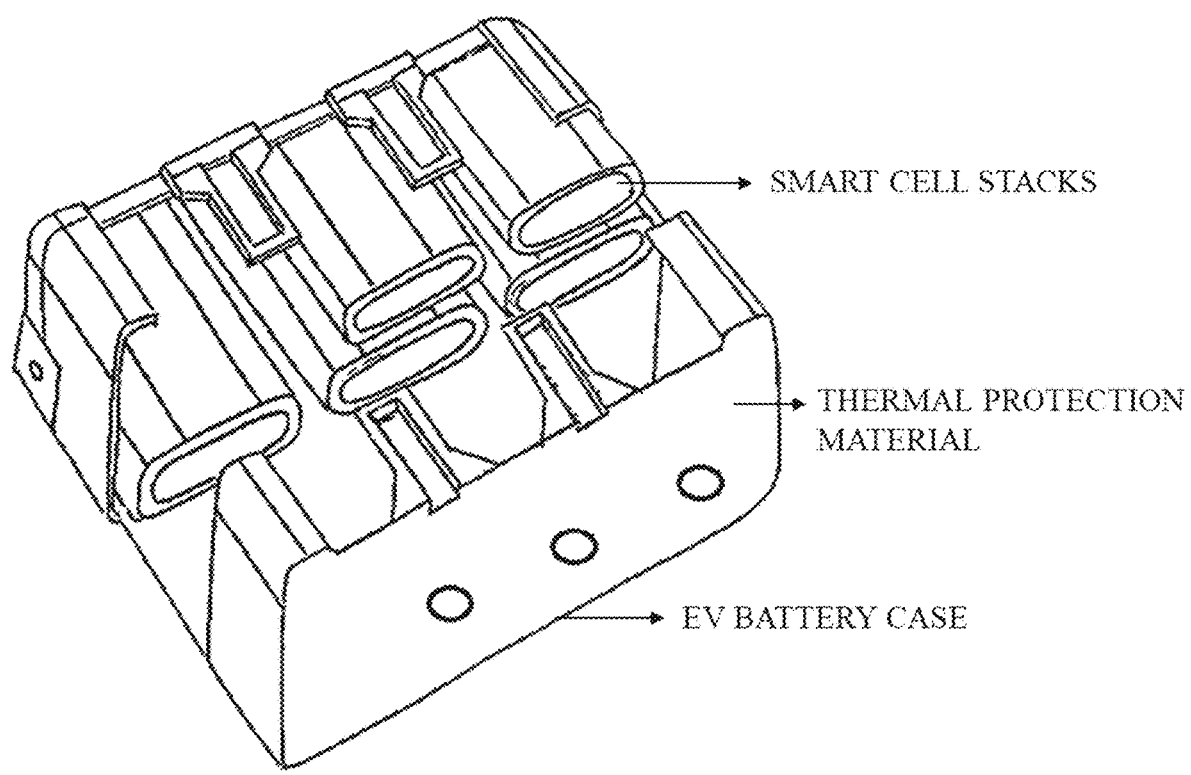
FIG. 3 shows a removable graphene cell stack, in one or more embodiments.

FIG. 3 shows a removable graphene cell stack of the system, in one or more embodiments. In an example, a pure organic carbon-based removable smart material-based cell stack is installed in the electric vehicle's trunk. The pure organic carbon-based removable smart material-based cell stack is connected to the system for battery monitoring and management.

Figure 4A:
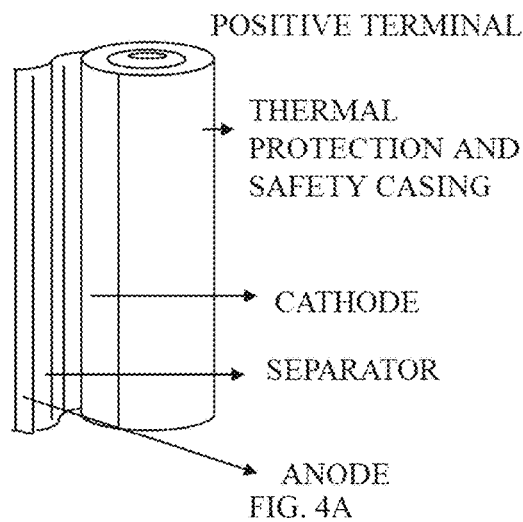
FIG. 4A, FIG. 4B and FIG. 4C show different shapes of batteries, in one or more embodiments.
Figure 4B:
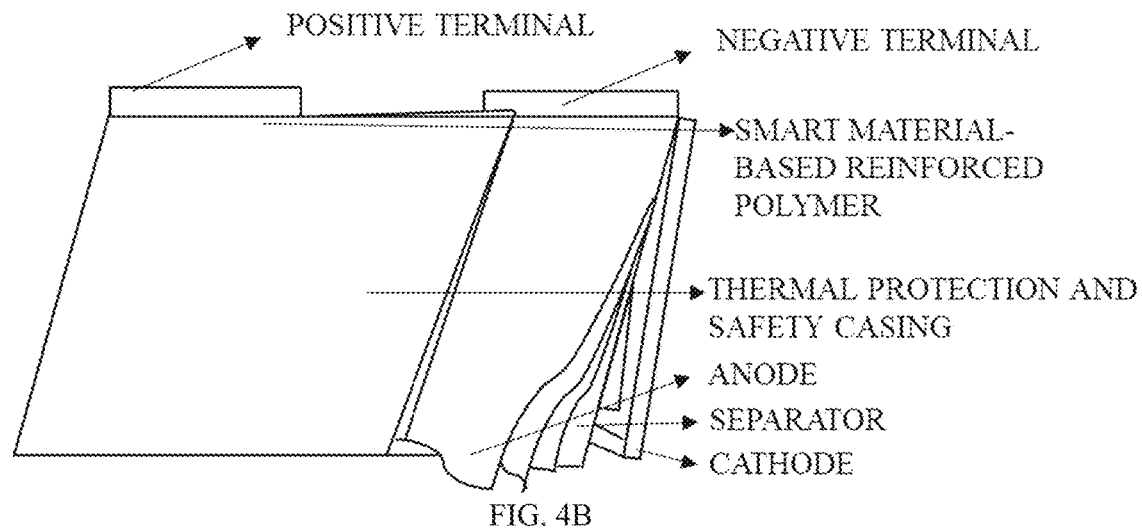
Figure 4C:
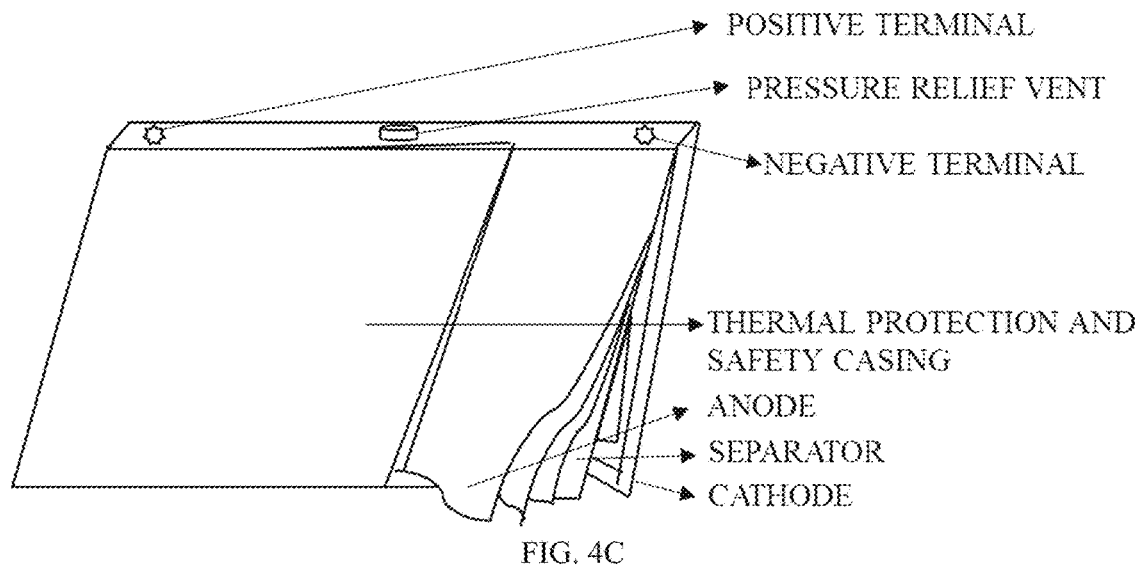

FIG. 4A, FIG. 4B, FIG. 4C show different shapes of batteries that can be used with the system, in one or more embodiments. FIG. 4A shows a cylindrical shaped battery. The cylindrical shaped batteries have a hard case and high volume, are low cost and easy to scale. FIG. 4B shows a prismatic type of battery. The prismatic type of batteries have hard cases with high energy density efficient cell cases, are medium cost and easy to scale. FIG. 4C shows an organic polymer type casing battery. The organic polymer type casing, organic polymer can be used as the safety casing of the cells, have high strength smart material-based sheets, and can be used in the flexible and viscoelastic organic polymer-based casing as a reinforcing agent in the organic polymer nanocomposites. This type of casing has high elasticity and is flexible with high energy density and semiconductor and insulator properties.

In an example, a cylindrical shaped battery can be used. The cylindrical shaped batteries can comprise extremely flexible organic polymer casing. The organic polymer can be used as the safety casing of the cells. The organic polymer casing provides high strength single layered graphene sheets to be used in the flexible and viscoelastic organic polymer-based casing as a reinforcing agent in the organic polymer nanocomposites.

In one embodiment, the system can dissipate additional heat generated by the microchip assembly or the polymer-based cell packs more effectively and efficiently to improve performance and durability. Maintaining optimum heat is a challenging consideration in nano electronics. The goal is to control the effective direction of the heat flow away from the heat sources, this can be very challenging at a nanoscale level. Internally some 'key' components include integrated circuits, ultra-capacitors, cell packs, STMS, SEMS, microchips or monolithic integrated chips or electronic circuits or microprocessor of semiconductor material integrated into the various subsystems of the smart device. Microchips are the heart of the smart energy devices, also used in other high-performance electronics, such as lightweight computers, and cell phones. These Integrated circuits, also called microelectronic circuits, microchips, or chips are an assembly of electronic components, fabricated as a single assembly unit, in which miniaturized active devices (transistors and diodes) and passive devices (capacitors and resistors), and their interconnections are built up on a thin substrate of semiconductor material to perform the best at optimum temperatures. Microprocessors today can easily pack more than 150 billion transistors in each square millimeter of chip. Adequate cooling and thermal management of the integrated circuit assembly may vary from device to device. The microchip assembly should not be heating up more than desired and the overall system effectively manages the flow of heat. The heat source at the nanoscale would dissipate heat more efficiently if transistors are packed closely together, would not overheat, and hence would cool down much more quickly. When placed close together, the vibrations of atoms or phonons and the consequent heat energy so produced would effectively tend to rebound and ricochet off each other, scattering waste heat away from the heat generating source and cooling the transistors down quickly. Accumulation of waste heat at the atomic or super atomic level can encourage temperature build up, thus reducing performance and overall durability of the assembly. The EV battery cell packs and integrated circuits would be designed to effectively manage the vibrations of atoms that carry heat in solids also referred to as phonons. As the heat from those transistors or cell packs dissipates, it effectively forces that energy to flow more intensely in a uniform direction away from the transistors or the initial heat source also referred to as conditional thermal maneuvering. A phonon is a quantum of energy, or a quasiparticle associated with a compressional wave such as sound or a vibration of a crystal lattice. A phonon is a collective excitation in a periodic, elastic arrangement of atoms or molecules in condensed matter, specifically in solids. The heat outside is to be maneuvered into the substrate and away from the heat generating sources that could be the integrated circuit assembly or the polymer cell pack. This way the wasted heat could be used for productive and regenerative purposes.

Figure 5:
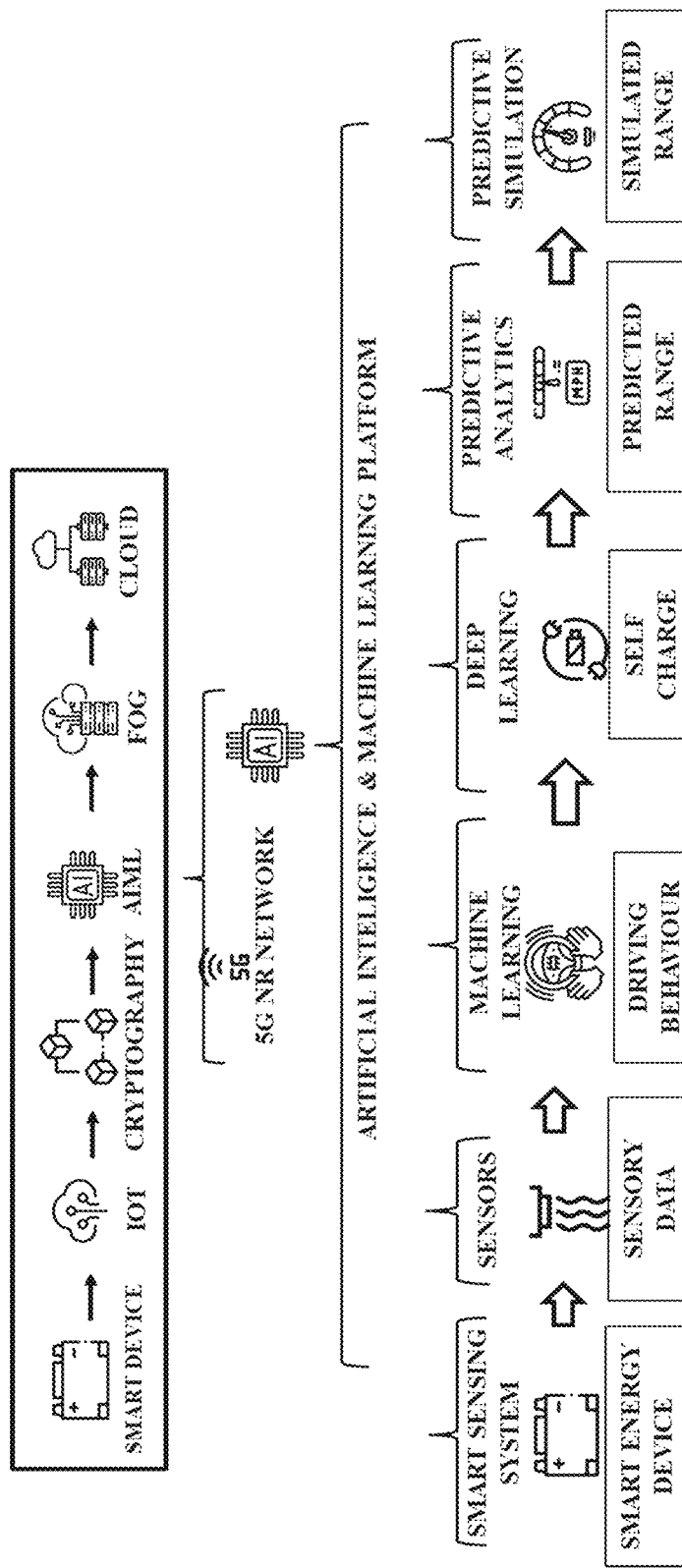
FIG. 5 depicts deep learning components of the smart battery system, in one or more embodiments.

FIG. 5 depicts deep learning components of the system, in one or more embodiments. The design employs unique IoT optimization, AI and deep learning modules that integrate into the battery's hardware to create a smart, complete solution. The system uses AIML based structure optimization algorithms that can predict and determine the most optimum internal configuration according to the smart battery's requirements under varying operating conditions. The system will be designed to protect the asset's authenticity by collecting and analyzing granular sensory data to vastly improve performance, energy density, battery safety, battery life, complex workflows optimization, cost of ownership, and most importantly extending range by employing predictive analytics and simulations.

In an embodiment, intelligent edge, IoT, fog, cloud, blockchain, AIML and 5G or higher connectivity are integral to the creation and existence of smart rechargeable energy devices and collectively all of them are to be literally inseparable. Intelligent Edge, AIML, blockchain and IoT operating on a virtual (cloud) environment will make the smart batteries viable on a scale, and through IoT the lives of most people using these smart energy devices will be influenced daily by intelligent edge and AIML. To reap the full benefits of intelligent edge, IoT and Big data, full utilization of the speed and accuracy of Big data analysis is needed. This involves the use of advanced qualitative and quantitative methods such as Intelligent Edge Processing and Artificial Intelligence (AI), including Machine Learning (ML), to analyze the data in real-time, and to perform continuous monitoring of the system, discover connections and predictive patterns, provide situational awareness, support decision making on the fly, and ease the most concerning issue of 'range anxiety'.

An AI based neuron network can receive a sensory signal and processes and signals the neurons connected to it. The "signal" at a connection is a numerical integer, and the output of each neuron is computed by a nonlinear function of the sum of its inputs. The connections are called edges. Neurons and edges typically have a weight that adjusts as the machine learning components proceed. The weight increases or decreases the strength of the signal at a connection. Neurons have a pre-designated threshold such that a signal is sent after the signal crosses the threshold.

The adjective "deep" in deep learning refers to the use of multiple layers in the network. Deep learning is a unique variation which is concerned with an unbounded number of layers of bounded size, which permits practical application and optimized implementation, while retaining theoretical universality under given conditions. In deep learning, each layer eventually learns to transform its raw input data into a slightly more abstract and composite representation. Neurons are aggregated into layers and the layers perform the needed transformations on their inputs. Signals travel from the input layer to the last layer or the output layer, possibly after traversing the layers multiple times. In deep learning the layers are also permitted to be heterogeneous and to deviate widely from the existing models, for the sake of efficiency, trainability, and functioning, hence the structured or Credit Assignment Path (CAP) depth. The CAP therefore is the chain of data transformations from input to output. In one aspect, for recurrent neural networks, a signal may propagate through a layer more than once, the CAP depth is then potentially unlimited. Deep models (CAP >2) can extract better features than shallow models and hence, extra layers help in learning the features effectively.

Figure 6:
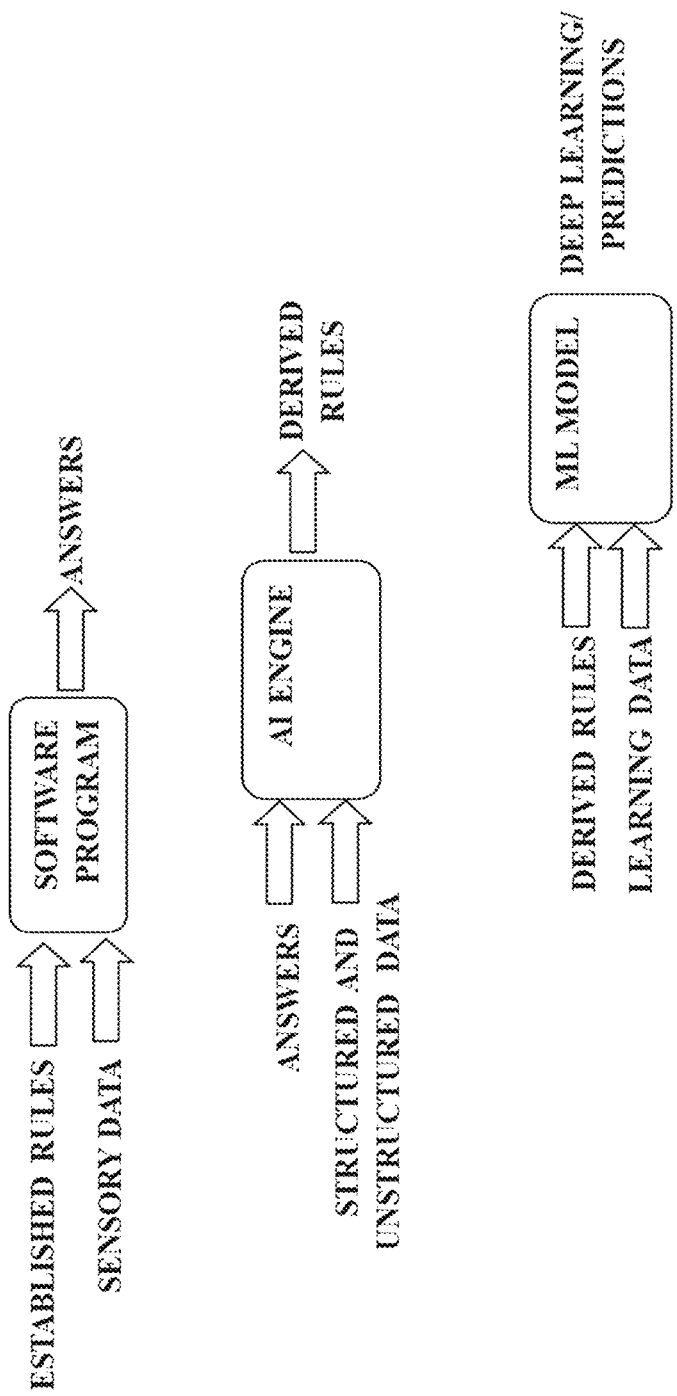
FIG. 6 depicts the comparative process of functional performance by traditional software programming and machine learning by AI engine in one or more embodiments.

FIG. 6 depicts the comparative process of functional performance by traditional software programming and machine learning by AI engine. Machine learning is an automated process in which rules are derived automatically from structured and unstructured data and answers comprising predetermined or specified outputs. The derived rules and learning data are then compiled into a machine learning model for deep learning to enable predictions.

In an embodiment, the deep learning algorithms can be applied to unsupervised learning tasks. This is a benefit because unlabeled data generated due to the unpredictable driving behavior, driving conditions and environmental conditions are more abundant than the labeled data.

In an embodiment, to identify potential problems, the data is to be analyzed in real-time in terms of what is normal and what is not. Machine Learning (ML) starts with the outcome variables (e.g., energy usage, energy capacity, energy density, power density, cell pack health, device health, system performance, usage pattern, driving tendency, energy saving, available range, etc.) including weather and environmental data and then automatically analyzes the predictive variables and their interactions. The machine learning model provides the goal and then lets it 'learn' using labelled and unlabeled data to identify factors that can help in reaching the goal. Correlations and deviations are identified on the fly based on real-time data streams. In an IoT and intelligent edge environment, AI and ML are to be designed to collate and analyze the billions and billions of data points in real-time to render predictive analytics and intelligent situational awareness on the fly that is to be displayed on a touch screen interface leveraging metaverse and immersive simulative technologies.

Machine learning is a subfield of artificial intelligence that accords smart systems the unique ability to self-learn or self-train without explicitly being programmed. Machine learning takes the approach of letting systems learn to adjust and finetune the program themselves to ultimately be able to generate highly intelligent output or analytics or decisions on the fly, through repetitive functions. Input data gathered, might mean millions, billions or even trillions of input variables. The more the data, the better the outcome. Machine learning simply starts with data—numbers, text, photos, or speech, etc., that is gathered, curated, and prepared to be trained on. To start with, the machine learning model to be used is appropriated, large amounts of data is gathered, data is classified, clustered, and processed, to allow the model to train itself to find patterns or generate predictive analytics. Over time, developers tweak the model, including changing its parameters, to guide it towards more accurate and desirable results. Steps involved are: gathering data, preparing data, selecting the learning model, evaluating training ability, and performing hyper parameter tuning. Some of the key types of learning models to be used by the system include classification models, clustering models, regression models, dimensionality reduction models, and deep learning models. Supervised learning models are trained with labeled data sets, which allow the models to learn and achieve perfection over time. In unsupervised machine learning, the model looks for patterns by eliminating noise and looking for redundant features in unlabeled data. Reinforcement machine learning trains computer models through trial and error to take the best actions by establishing a continually improving system. Reinforcement learning can train models to learn and train autonomously by assuring the repetitive technique when it makes the right decisions, which helps it learn over time what actions it should take. Eventually learning models are able to scan through and analyze large amounts of data in real-time and automate decision-making at the scale and speeds where humans would just not be able to.

In yet another embodiment, ML based algorithms are to be continually improved as more data is captured and assimilated. This means that the existing ML algorithms continuously work on the analytics, learn, and improve over time, and render predictive analytics which can autonomously adjust and become more accurate and precise over time. Ordinary algorithms with very large datasets tend to be better at learning than good algorithms with limited or smaller datasets. The predictive analytics made possible by machine learning is extremely valuable for the multitude of IoT based smart energy devices leveraging intelligent edge processing. With machine learning, patterns, correlations, and anomalies can be detected and discovered in real-time from which new ways of working can be learned, so that ultimately, better decisions can be made. By analyzing data from the multitude of integrated smart nanosensors, and IoT devices leveraging intelligent edge, these ML based models and algorithms can self-learn what is typical and then self-train to detect when something abnormal begins to happen as the millions of connected smart batteries generate, store, curate data and analyze the billions and billions of data points in real-time.

In an embodiment, IoT based smart energy devices will follow five basic steps: (1) sensing and measuring, (2) producing and sharing data, (3) storing and curating data, (4) analyzing and perfecting via self-learning using machine learning, and (5) tracing and authenticating using the Hyperledger and (6) predicting and providing situational awareness.

In an embodiment, the AIML framework will make the huge amounts of data from these IoT based smart energy devices valuable, while IoT is the best source for the real-time data that intelligent edge and AI needs to develop. These smart energy devices are to be transformed from "smart", i.e., connected to the internet with a corresponding centralized high-performance application, to "intelligent", which is characterized by the ability for the smart energy devices to learn from their interactions with users and the other smart energy devices, as well as the interactions with all other devices in the network. Artificial Intelligence ensures that the IoT devices become highly intelligent. The Intelligent edge processing combined with the powerful Blockchain's Hyperledger ensures that the overall system becomes highly secure and easily traceable.

In an embodiment, the AIML framework uses data flow graphs by sorting through multiple data layers called nodes to make decisions based on rules, and the AIML framework outputs statistics and predictive analytics using a large dataset of labelled and unlabeled data in the AIML library. Large sets of ML algorithms allow for improved deep learning, overall performance, accuracy, and speed. The commonly used Artificial Neural Networks (ANNs), are Vanilla Neural Networks (VNN), Recurrent Neural Networks (RNN), and Convolutional Neural Networks (CNN). The AIML framework as part of the system, running the RNN models, will support machine learning algorithms such as classification, non-linear regression, and clustering.

In an embodiment, a high-performance AI engine based on RNN can constantly analyze and compare both large numerical datasets of available labelled and unlabeled data based on usage data generated by the smart energy devices.

In an embodiment, the applied ANNs comprises (a) Input layer, (b) many Hidden layers, and (c) Output layer. Each layer comprises n number of neurons with an activation function associated with each of the neurons. The activation function is the function that is responsible for introducing non-linearity in the relationship. While the output layer is to contain a linear activation function, every layer is associated with regularization functions that are responsible for preventing overfitting. ANNs comprises two phases: (1) Forward Propagation and (2) Backward Propagation. In the smart system, forward propagation process is required for multiplying weights with each feature and adding up weights with each feature. The bias also gets added to the result. While backward propagation is the process of updating the weights in the model. Backward propagation implements an optimization function and a loss function.

In an embodiment, an ANN is a computational system that renders predictive analytics based on the vast amounts of existing data that is being continuously generated. An artificial neural network comprises: (1) input layers that take inputs based on existing data, (2) hidden layers that use the backward propagation to optimize the weights of the input variables to improve the predictive accuracy of the model, and (3) output layers that are the output of predictive analytics based on the analyzed data from the input and hidden layers.

In an embodiment, deep learning approach begins with generating optimal algorithms at a completely random and ground level. The learning data is characterized to include a multitude of the developed fundamental algorithms. Most of the algorithms can be individually insufficient and sparse and limited and therefore some code can eventually be found to be better than the rest. These pieces are then to be collectively used in the deep learning model. As new sets of algorithms get generated, they are continuously tried, and this process keeps repeating until such an optimal set of algorithms are found that is better than anything else at solving the problem and thereby output the most desirable optimal predictive analysis.

In an embodiment, the optimization of large datasets, of carbon-based or smart material-based nanosensor generated data as a potential means of improving the adopted AIML monitoring based smart nano sensing systems, ultimately will lead to the creation of smarter and more accurate usage and eventual performance in terms of range of the networked smart energy devices.

In an embodiment, carbon-based or smart material based nano sensing techniques will utilize the reinforcement of deep learning based on the use of Evolutionary Neural Networks (EANNs). The AIML based monitoring system can learn, from mostly very complicated reinforcement information by analyzing vast amounts of training data based on evolutionary techniques, to produce desired solutions and predictive analytics most needed to identify safety hazards and needed situational awareness. EANNs can be considered as a combination of artificial neural networks (ANNs) and evolutionary search procedures such as genetic algorithms (GAs). There are three levels of evolution in EANNs, being the evolution of connection weights, architectures and learning rules. It is seen that the evolution of learning rules and their interactions with other levels of evolution tend to play a vital role in EANNs. It is seen that EANNs can be applied more widely than supervised learning algorithms, which require a syllabus of correct input-output pairs. In contrast, EANNs require a measure of a network's performance on a task. EANNs can effectively be used as part of the reinforcement learning paradigm and can be contrasted with conventional deep learning techniques that use gradient descent on a neural network with a fixed topology.

In an embodiment, the system may use a linear activation function using the AI based Keras Library to create a regression-based neural network. Keras is an open-source software library that provides a R and Python interface for artificial neural networks. The system also uses a combination of open-source projects that include Elasticsearch, Logstash, and Kibana commonly referred to as the ELK stack. The ELK stack provides a powerful platform that collects and processes intelligent edge data from multiple data sources, stores that data in one centralized data store that can scale as data grows, and provides a set of tools to analyze and visualize the data. Logstash collects events data and then parses and transforms the data. The transformed data is then stored and indexed to allow extensive search and visualization capabilities. ELK Stack is designed to take data from any source, in any format, and to search, analyze, and visualize that data in real time.

In an embodiment, the system may use the output dataset by the smart energy storage device and other relevant data to intelligently modulate and predict the highly optimized range of the rechargeable smart battery based on the current usage of a given user and based on many given attributes.

Figure 7:
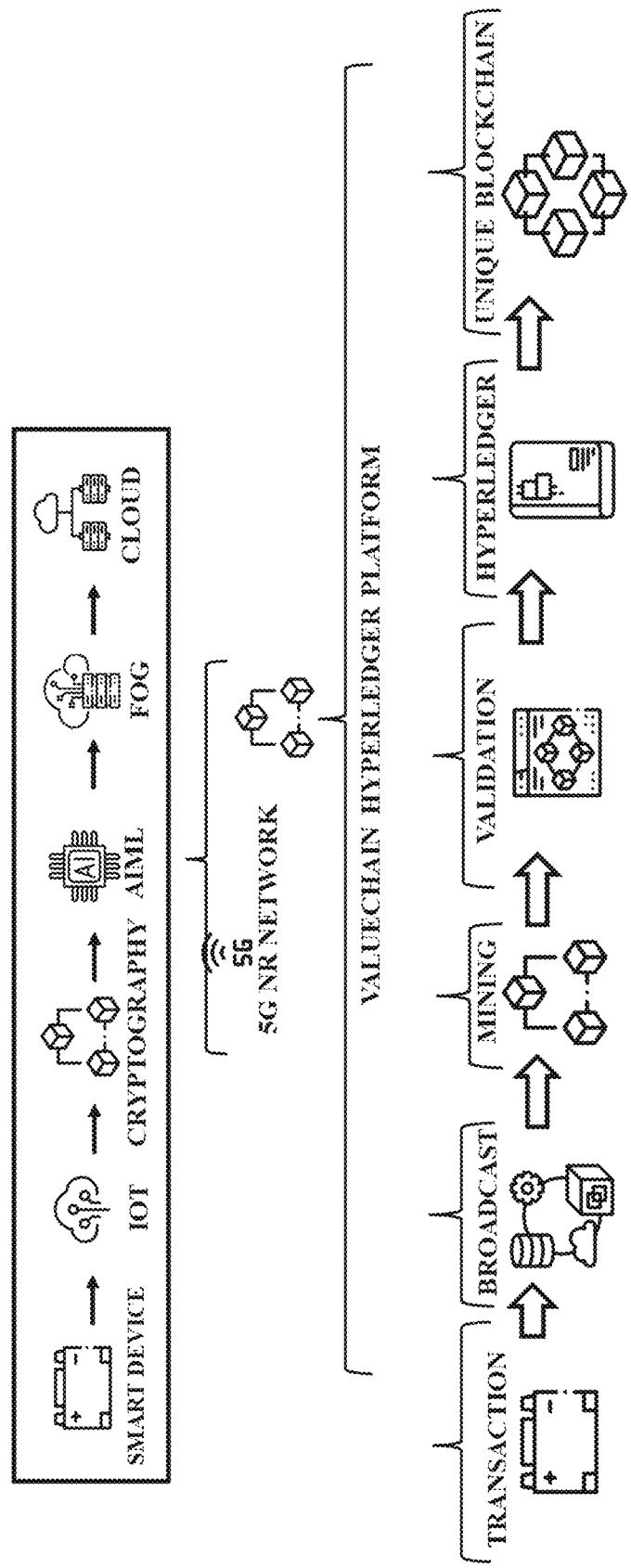
FIG. 7 depicts blockchain components of the smart battery system, in one or more embodiments.

FIG. 7 depicts blockchain components of the system, in one or more embodiments. The combination of IoT and Blockchain provides a powerful mechanism to gather, curate, store and share data with all members in the network securely and in real-time. The large number of connected IoT devices will use open standards-based connected sensors to capture data in real-time and thereby verify and authenticate the EV Batteries, their removable cells, and their regulatory compliance. Embedded biosensors will efficiently alert and automatically initiate the AI based Monitor and Control (M&C) actions for temperature deviations or imminent degraded operations. At every stage, the IoT-connected sensors will produce data with sufficient granularity to conduct root-cause analysis, determine liability in case of an off-nominal event and provide any number or type of track and trace capabilities, and when IoT feeds into blockchain, the data can be shared within a P2P Network or a distributed hyper ledger leveraging a high-performance cloud-based network. Every stakeholder is to be an authenticated and authorized node in the blockchain and can access all data in the blockchain network at any time. The value chain data will be fed in unremittingly, will be continuously validated, immutable and secure. Smart contracts and the self-executing scripts in the value chain will integrate all stakeholders thus allowing efficient, distributed, heavily automated workflows for granularity of data sharing and mitigating all trust issues. Smart contracts will provide a fully transparent, single source of truth about the cradle and source of materials, free of all defects, condition, and state of health in production (including temperature and performance deviations), change of custody and ownership details and all in real-time. Once data is securely shared with other nodes according to smart contracts, actions can be initiated based on information that is highly trusted and indelible. The cloud based blockchain service with high availability and preconfigured blockchain code will optimize business processes, secure transactions, identify battery management, identify event services, continuously monitor, and perform several other operations all integrated with a single user interface.

In an embodiment, blockchain technology is to be used for tracking the origins of the authenticity of genuine smart materials and other precious commodities. This would ensure the elimination of counterfeits and repurposed smart batteries from entering the network. Blockchain is to be used to allow the overall system to track the provenance of primary elements and finished products that include the smart battery and the carbon-based or smart material-based cells from their origins to the EV manufacturers to the end-consumers. Blockchain is to be used for supply chain monitoring for smart batteries to enable rapid and real-time tracing and monitoring of healthy vs deteriorating EV batteries that are in use. Blockchain is to be used in detecting counterfeits by associating unique identifiers to products, documents, and shipments, and storing records associated with transactions that cannot be forged or altered. The designed system is to use blockchain together with some sort of two-factor authentication such as Quick Response (QR) Codes or digital certificates like Secure Sockets Layer (SSL) Certificates for authentication. Additionally, blockchain is to be used to speed up the time it takes to locate fully charged smart cells in the network nearest to the user to swap out the under-charged or the non-charged cells with the fully charged cells.

These smart batteries can be tracked using blockchain and can be controlled by the legal authorities using a unique key identifier and a centralized certificate, when purported that the corresponding electric vehicle(s) was used for illegal activity. Blockchain will be used in the overall supply-chain distribution framework that allows EV manufacturers more control over how their finished goods and associated data circulate among the automobile manufacturers and all other end users. Blockchain mining, the peer-to-peer (P2P) computer computations by which transactions are validated and verified, traditionally requires a significant amount of energy. Proof of Work (PoW) is the first consensus algorithm for a blockchain to secure data. As blockchains scale across industries, there is an unstoppable paradigm shift behind the distributed hyper ledgers that will determine how we track products, handle workloads, manage sensitive PII data, transact in digital activities, and create new supply chain systems. In the world of blockchain, innovation is driven by lower energy costs, increased decentralization, and greater efficiency. Energy is also consumed when storing data on the blockchain. Inside the blockchain industry, concern about high energy consumption has led some companies to reconsider their blockchain models and the overall use of the technology. A single blockchain transaction could use about 700 odd kilowatt-hours of electrical energy, the amount of energy the average U.S. household consumes in a month. Side chains are emerging on the blockchain network using Proof of Authority (PoA) thus permitting pre-selected nodes to run a side chain, using about the equivalent energy of a light bulb, or 78 watts. The system proposes to (1) reduce the dependency on the highly specific mining hardware that rely on SHA256 using ASCI chips optimized for computing hash values and rather use general-purpose Graphics Processing Units GPUs for mining, (2) use centralized certificates to authorize transactions using a permissionless system rather than utilizing traditional energy-hungry mining, (3) increase the block size in a controllable manner without impacting latency and overall security, (4) reduce and limit the number of voting participants in the consensus, if it is going to be a permissioned blockchain, (5) reduce the degree of redundancy, i.e., the number of nodes that perform given operations, and the workload associated with operating a transaction, (6) promote "sharding" or splitting the nodes in the network into subsets ("shards") and processing each transaction on one of these subsets in the Proof-of-Stake PoS mechanism (7) implement solutions in favor of PoS rather than PoW. It is seen that, as storage capacities and network speed continue to improve overtime, a considerable increase in block sizes might be conceivable in the future. This would enable higher transaction rates without a noticeable increase in energy consumption. PoS consensus mechanism is seen to be the better alternative for the permissionless systems required for open decentralized applications. The computational complexity of the PoS mechanism is low and, typically, insensitive to network size. It is, therefore, very energy-efficient for large-scale systems. It is seen that the overall energy consumption of PoS blockchains is several orders of magnitude lower than that of PoW. The charged replaceable cells and the self-charging nature of the pure carbon-based or smart material-based cells could be supported by constantly charging and feeding the blockchain network with the need for a PoS consensus mechanism that is perceived to be highly-energy efficient.

Figure 8:
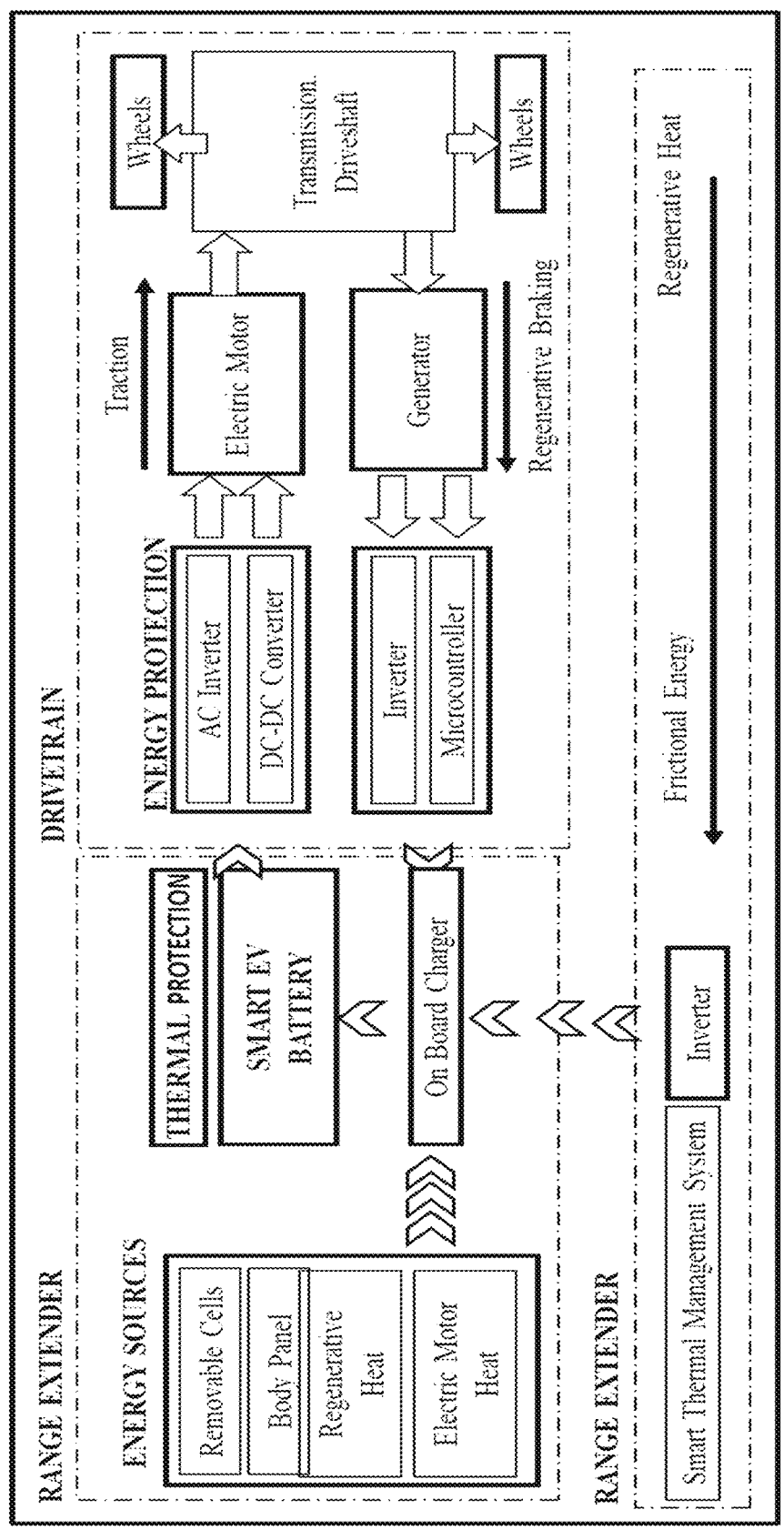
FIG. 8 depicts a range extender component of the smart battery system, in one or more embodiments.

FIG. 8 depicts a range extender component of the system, in one or more embodiments.

In an embodiment, the system will use the dataset output by the smart energy storage device to predict the highly optimized range of the electric vehicle's rechargeable smart battery based on the current usage of a given user based on some given attributes.

In one embodiment, an additional battery's cell pack with thermal protection will be connected to the main EV battery cells to provide additional energy capacity to extend the range. The additional cell pack unit will be installed in the trunk of the car that is easily accessible by the user. The additional cell pack or packs installed in the trunk will support removable cells and can be replaced at filling stations or at specialized vending machines. Electric cars can then easily be extended to the desired range and empty battery cells can be charged or exchanged for fully charged cells at green energy locations or filling stations. An extra set of cells that are separate from the battery will be stored in the trunk of the car, but still connected to the battery to transport the energy necessary to keep the battery running. These cells, once they run out of charge, can be manually and easily removed, and replaced by fully charged cells. In turn, the removed cells will be put into charge to be used later once they gain full charge. The purpose of these removable cells is to be able to quickly change cells in the middle of a car ride for extra range and energy, keeping the smart battery running. In case the smart cells within the battery run low on charge, these extra packs of cells installed in the trunk will provide the most needed spares to support the battery and can be easily and swiftly removed and replaced.

In an embodiment, the system may import needed data libraries, and the variables to be normalized for the neural network to interpret them properly i.e., the variables can be transformed using the MaxMinScaler. The data, then can be split into training and test data. Next, the neural network will be trained by using plurality of input variables from the dataset (battery size, energy capacity, volumetric energy density, gravimetric data, number of cells, percentage of charge, miles, environmental impacts, performance, usage date, range etc.) along with two hidden layers of 12 and 8 neurons respectively to finally use the linear activation function to process the output. Next, the Mean_Squared_Error (MSE) and Mean_Absolute_Error (MAE) may be used to leverage loss functions—i.e., an estimate of how accurate the neural network is in predicting the test data. From the output, the system can see that the more epochs are run, the lower MSE and MAE become, indicating improvement in accuracy across each iteration of the model. The system can clearly see that the model is able to calculate both the training loss and validation loss, i.e., the deviation between the predicted x and actual y as measured by the mean squared error. By training the model over a given number of forward and backward passes, the model can predict the value of y more accurately. The model gains a high degree of accuracy as the number of epochs (or number of forward and backward passes) is increased.

In an embodiment, the AIML based monitoring system is to be developed to have a more complete understanding of deep learning by using 'self-supervised' learning methods. The model will allow the system to time-correlate and try to fill in missing portions of any user-based event or activity to analyze and output key statistics most needed to communicate the current charge available and the most optimized range. Using linear regression models, the deep learning model can establish correlations between present state and future state of the energy storage device in use. It can run regression between the past and the future state based on the current usage parameters. Deep learning does not care about time, or the fact that something has not happened yet. Given a time series, deep learning may read a string of events and predict the event most likely to occur next. In this case it would be the early recognition of a device failure or discharged state and be able to predict the existing charge, and thereby be able to analyze the degree of the optimal range available to use. The bigger the dataset the better will be the system's ability to predict. The better the system can predict, the better we can prevent and pre-empt. The more the data of the AI-aided nano sensing system can train and learn, the more accurate it is likely to be.

In an embodiment, regression analysis in running traditional regression functions is to be typically done using math or statistics libraries. The types of regression analysis that are to be utilized are linear regression and multiple linear regression. They help in determining the future risks and optimizations, the purpose being to predict an outcome based on historical data. This historical data is understood with the help of regression analysis. The linear regression can learn the linear relationship between the features and target but is unable to learn the complex non-linear relationship; hence applying Artificial Neural Networks (ANNs) for regression, multiple linear regression, is applied for regression analysis. ANNs can learn the complex relationship between the features and target due to the presence of the activation function in each layer.

$$Y_i = B_0 + B_1 X_i + \varepsilon_i$$

Where: $B_0 + B_1 X_i$ is the linear component and
$\varepsilon_i$ is the Random error component and
$Y_i$—Dependent Variable
$B_0$—Population Y intercept
$B_1$—Population Slope Coefficient
$X_i$—Independent Variable
$\varepsilon_i$—Random Error Term
the $Y_i$ being the hypothesis function, with the objective of regression analysis to learn the parameters in the hypothesis function. The model parameters being intercept (beta 0) and the slope (beta 1).

To run a neural network model equivalent to a regression analysis, a deep learning framework such as TensorFlow or Keras needs to be used. The basic perceptron would need to take multiple binary inputs and provide a single binary output after some multiple mathematical computations. Extracting reasonable features is crucial for a successful usage of those linear regression models. The process of feature extraction is complex. ANNs using RNNs are capable of rapidly extracting features from given input data, superseding manually designed features. Also, Deep Neural Networks (DNNs) allow the extraction of very complex and abstract features from several different representations with respect to prior levels. All these features are then used to form an accurate desired output level. The regression analysis formula simply is Y=MX+b where:

Y is the dependent variable of the regression equation.
M is the slope of the regression equation.
X is the dependent variable of the regression equation.
b is the constant of the equation.

In an embodiment, the carbon-based or smart material-based nano sensing systems using deep learning techniques will be characterized by 'Deep Unsupervised Adaptive Learning.' Therefore, in RNNs—it is the "recurrent" part that makes RNNs smarter, in that their unique ability is to continuously improve upon their internal models. This is evolutionary and analogous to how a toddler learns to walk—the motor neurons work closely with the neurons in the toddler's brain to constantly sense and learn based on external feedback. These deep learning algorithms are commonly used for ordinal or temporal problems, such as time-series predictions.

In an embodiment, access to a large nanosensor-based library of labeled and unlabeled data which the AIML based monitoring system will utilize, will in turn increase the speed and accuracy of the performance of the smart energy storage devices. A reinforcement deep learning component is to be programmed to perform a task and learn to perform the multiple missions such as inducting self-charging, self-heating, dynamic thermal management, and real-time predictive analytics using automatic feature extraction and time-correlation techniques. The reinforcement-deep learning components ability to process and learn from huge quantities of labeled and unlabeled data provides a distinct advantage over even the most modern existing conventional external electric battery management systems.

In an embodiment, the system powered by a superfast 5G network, powerful intelligent edge, blockchain and AIML framework will be designed to be superfast when it comes to processing large-scale datasets with key features such as supervised and unsupervised learning algorithms and cross-validation. The AIML framework and library will be designed to support the use of simple Application Programming Interface (API) components using an Open API platform. The framework is to be powered with a powerful N-dimensional array, which will help with operations such as slicing and indexing, and to support linear algebra routines and deep learning models.

In an embodiment, the IoT based AI framework will have a lightweight architecture that allows computation on any Central Processing Unit (CPU) or Graphics Processing Unit (GPU), be it in a laptop, a tablet, a desktop, a server, or even a mobile device. The framework will support an interface to provide a high level of abstraction, which will allow for easy configuration of neural networks regardless of the framework it is sitting on. The framework would improve the accuracy of the method of battery cell M&C, disaster recovery of low performing cells, self-charging features, self-heating, dynamic thermal management, and outputting key data points needed using high precision nanosensors combined with intelligent edge computing, artificial intelligence, and machine learning methods. Deep learning and predictive analysis can aid the central system in timely identifying and recognizing safety hazards and ensuring the smooth functioning of the smart energy devices needed for longer range uses.

In an embodiment, knowledge and use of computer aided predictive techniques and systems utilizing natural language processing and cognitive artificial intelligence can better predict safety hazards before they occur and can improve the efficiency and performance of these connected smart energy storage devices to other smart devices such as smart phones for quick remote configuration changes based on the situational awareness output by the central system. This highly accurate sensing system will ensure environmental safety and reduce the need for extra charging cycles of the smart energy devices. The fewer safety hazards that occur and go undetected and the reduced downtime, the better.

Figure 9:
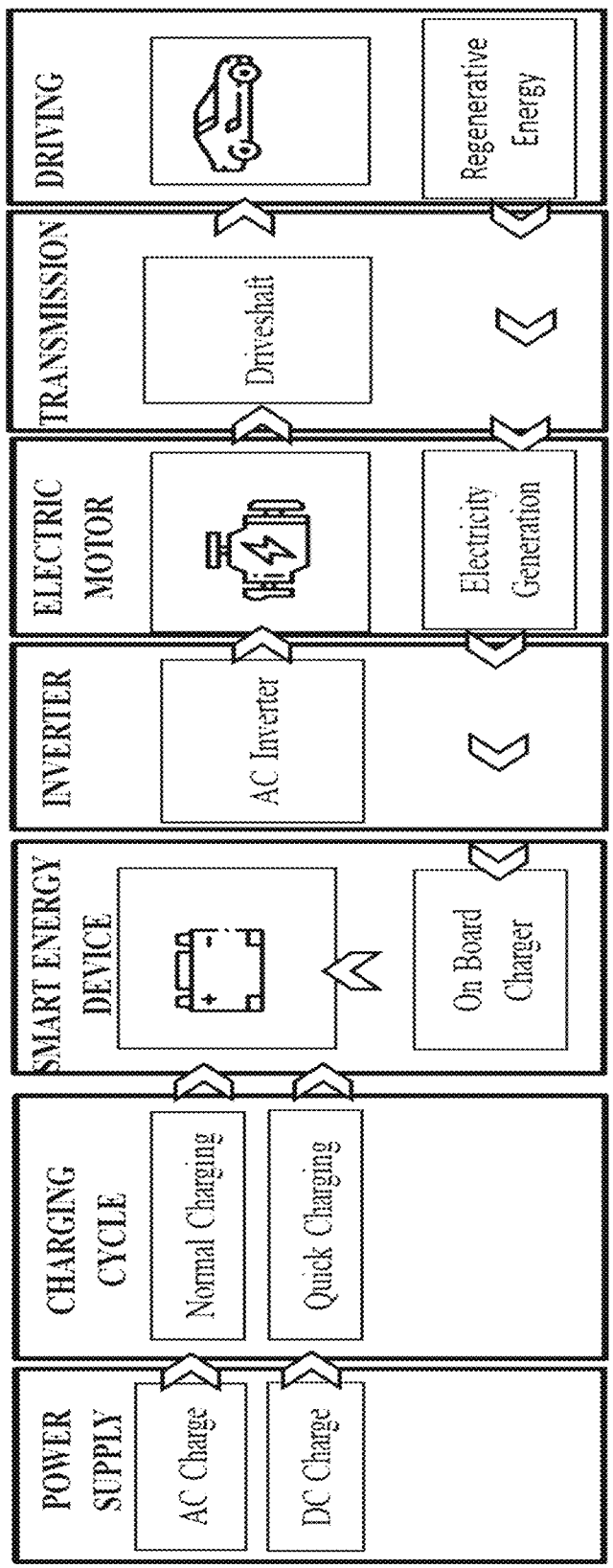
FIG. 9 depicts a smart energy loop of the smart battery system, in one or more embodiments.

FIG. 9 depicts a smart energy loop of the system, in one or more embodiments.

In an embodiment, the smart battery system can be used to capture energy that the electric vehicle generates while braking. Energy recuperative mechanisms that include regenerative braking are smart techniques that capture energy that electric vehicles generate that would otherwise be wasted. For example, heat is generated due to brake motion friction in the brakes that would be wasted when the vehicle decelerates or comes to a standstill while braking. It is a simple energy recovery mechanism that converts frictional or kinetic energy into a form that can either be used immediately or stored using a smart energy storage device until needed. Regenerative braking system is to be used to recover the kinetic energy dissipated as heat during braking which is more energy efficient than a traditional braking method. Going by the laws of physics, one may not recover all the kinetic energy that is lost but still a significant amount of kinetic energy can be converted and stored in the supercapacitor. The energy recovered will help in extending the range in electric vehicles.

When brakes are applied in electric vehicles, the motor controller (based on the brake pedal sensor output) reduces the performance or stops the motor. During this operation, the motor controller is designed to recover the kinetic energy and store it in the capacitor banks. When the motor accelerates the vehicle, the kinetic energy associated with it increases as a square of the velocity. During coasting, the vehicle comes to rest when the kinetic energy becomes zero. When we apply the brakes in the electric vehicle, the motor controller operates in such a way to bring the motor to rest or to reduce its rpm and thus its speed. The controller acts according to the input from the brake pedal sensor and carries out that operation. During this process, the controller will reduce and set the supply frequency. From the motor controller perspective, the speed of the motor is more than its synchronous speed. As the speed is reduced during braking operation, the motor now acts as a generator until the rpm decreases and sets to lower frequencies. This involves reversing the direction of the motor torque to that of the direction of rotation. During this process, the rotor of the motor connected to the drive axle can generate an Electro Motive Force (EMF) in the motor (analogous to a prime mover/turbine driving the rotor of the generator). When the EMF generated is more than the voltage of the capacitor bank, the power flows from the motor to the bank. Thus, the energy recovered can be stored in the capacitor bank.

In an aspect, a process is described herein. The process comprises: connecting a monitoring module and an Internet of Things (IoT) based control module of a rechargeable energy storage battery system of an electric vehicle to a smart battery management platform and a blockchain network that includes a plurality of charging station nodes; receiving periodically by the smart battery management platform, battery related information and one or more environment factors; extracting, processing, and analyzing the battery related information to retrieve a real-time feature of the rechargeable energy storage battery system and the one or more environment factors affecting battery life and battery performance; predicting in real-time, by the smart battery management platform, battery health and life status; rendering using immersive technology, real-time simulated display of situational awareness; and sending a control signal to the IoT based control module of the rechargeable energy storage battery system; wherein the process is configured for managing the rechargeable energy storage battery system via one of a battery charging station and a battery service station.

Figure 10:
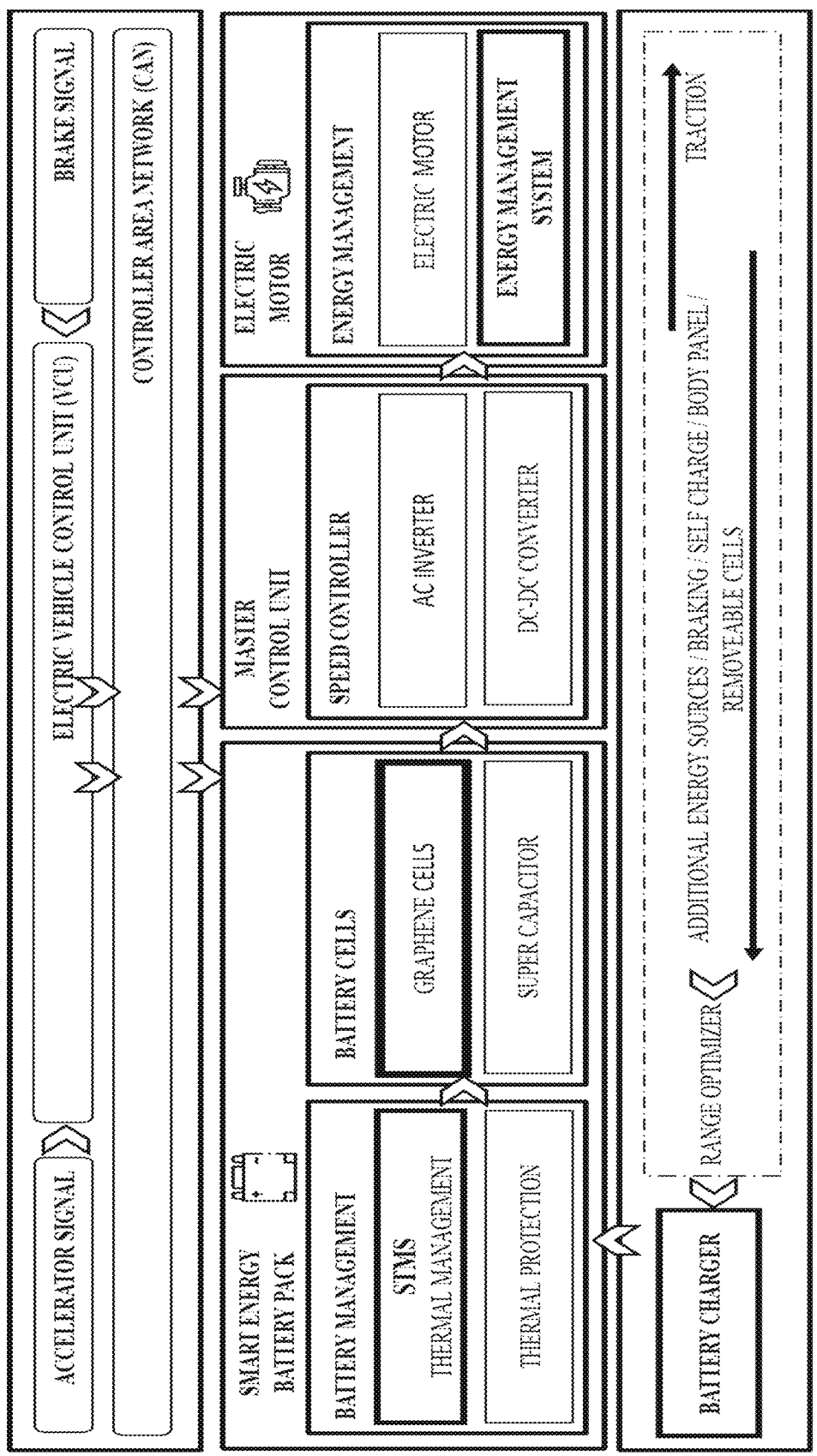
FIG. 10 depicts a process for range optimization of the smart battery system, in one or more embodiments.

FIG. 10 depicts process flow in the system, in one or more embodiments. The process flow may comprise the following steps:

Step 1: The monitoring module of the system will constantly collect key data related to the state of the device, performance, energy capacity, energy usage, health of connected parts, failover capabilities, switchover capabilities, logging capabilities, audit logs, IOPS per second, interconnectivity, rate of charge, charge capacity available charge, functioning components, functioning cells, GPS location, internal and external temperature, including other environmental data, etc., converted into real-time range availability and the health of the sensors.

Step 2: The microprocessor deployed on a small battery management system will manage the vast amount of data collection and dissemination.

Step 3: The vast amount of structured and unstructured data will be used to facilitate real-time smart and local analysis.

Step 4: A network solution such as fog nodes using intelligent edges will channelize the data to an edge computing service using fog devices via a secure 5G connection to enable data analytics and data gathering to occur at the source of the data.

Step 5: The data will be transformed into useful information via data processing using a fog engine connected to an AI engine.

Step 6: The relevant information will be delivered to the cloud infrastructure for processing and continuous monitoring.

Step 7: The curated data that includes situational awareness, predictive and simulative analysis will be sent to the end user via web and mobile user interface by leveraging immersive technologies.

In an aspect, a method is described herein. The method, comprises: connecting a monitoring module and an Internet of Things (IoT) based control module of a rechargeable energy storage battery system of an electric vehicle, to a smart battery management platform and a blockchain network that includes a plurality of charging station nodes; sending periodically by the monitoring module, battery related information and one or more environment factors; and receiving a control signal to the IoT based control module of the rechargeable energy storage battery system from the smart battery management platform; wherein the process is configured for managing the rechargeable energy storage battery system of the electric vehicle.

Figure 11:
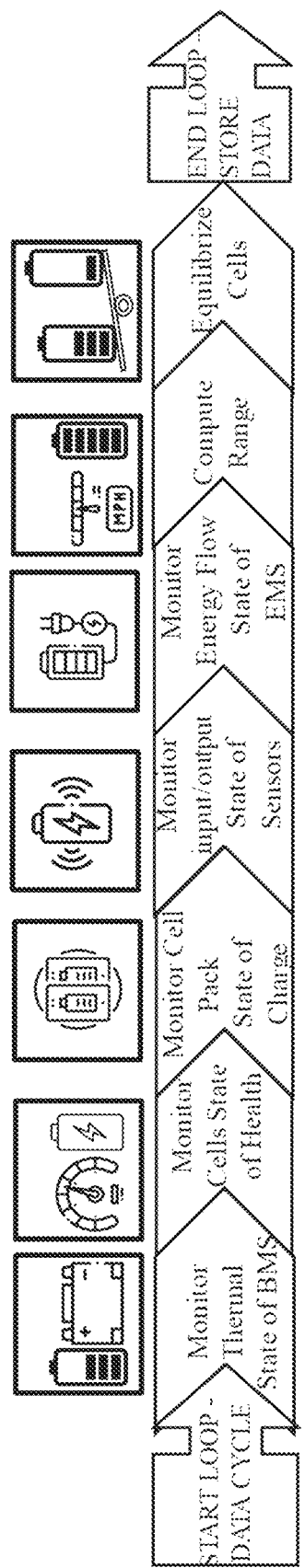
FIG. 11 depicts a data loop cycle of active cell packs for measurement and monitoring using the smart battery system, in one or more embodiments.

FIG. 11 depicts a data loop cycle of active cell packs for measurement and monitoring of the system, in one or more embodiments.

A vast variety of sensors are to be deployed and implemented to measure complex static thermal and aging effects, as well as dynamic thermal and self-healing effects. This is where system-level considerations come into play. Also, along with the fact that things are switching on and off, which strategically point to and bring focus to the power semiconductors. Since range is an issue—there is a continual need for bigger and bigger batteries. There are higher-power demands, and to fulfill the need for power, power electronics will be needed. The power electronics needed comprise compressors, pumps, motors, auxiliary power modules and the onboard charging module. They need to switch faster, because the faster you switch the less power you're going to waste, and ultimately, it's all about efficiency. This necessitates the need for autonomous capabilities, and it is seen that autonomous capabilities are very power-hungry. A lot of supplementary high-energy consumption components, which include sensors, cameras, a lot of data and image processing and a lot of additional components that are on the vehicle, also consume electrical power. These all need to be taken into consideration because collectively they all account for another huge drain on the vehicle's smart rechargeable energy storage device. All this and more are driving a greater need for a smart energy device or smart battery with a well networked IoT based intelligent edge tracking blockchain system supported by a AIML learning model that leverages an Immersive Technologies for predictive simulation and display. And all this needs to be set in the context of safety of breakdowns and security from cyber vulnerabilities and intrusion.

The system is to be designed to autonomously detect and simulate fault capabilities. To do so the system will be designed to automatically insert open circuits and short circuits, and programmatically run many fault scenarios. To ensure continuity of operations, the smart system will be enabled to handle any degree of perceivable faults and to support a well-designed mitigation system for handling all kinds of faults that could occur operationally. The deep-learning models are to be designed to detect and anticipate the worst-case scenarios, and then be able to switch over from high-risk modes and yet be able to maintain power mid-cycle.

Figure 12:
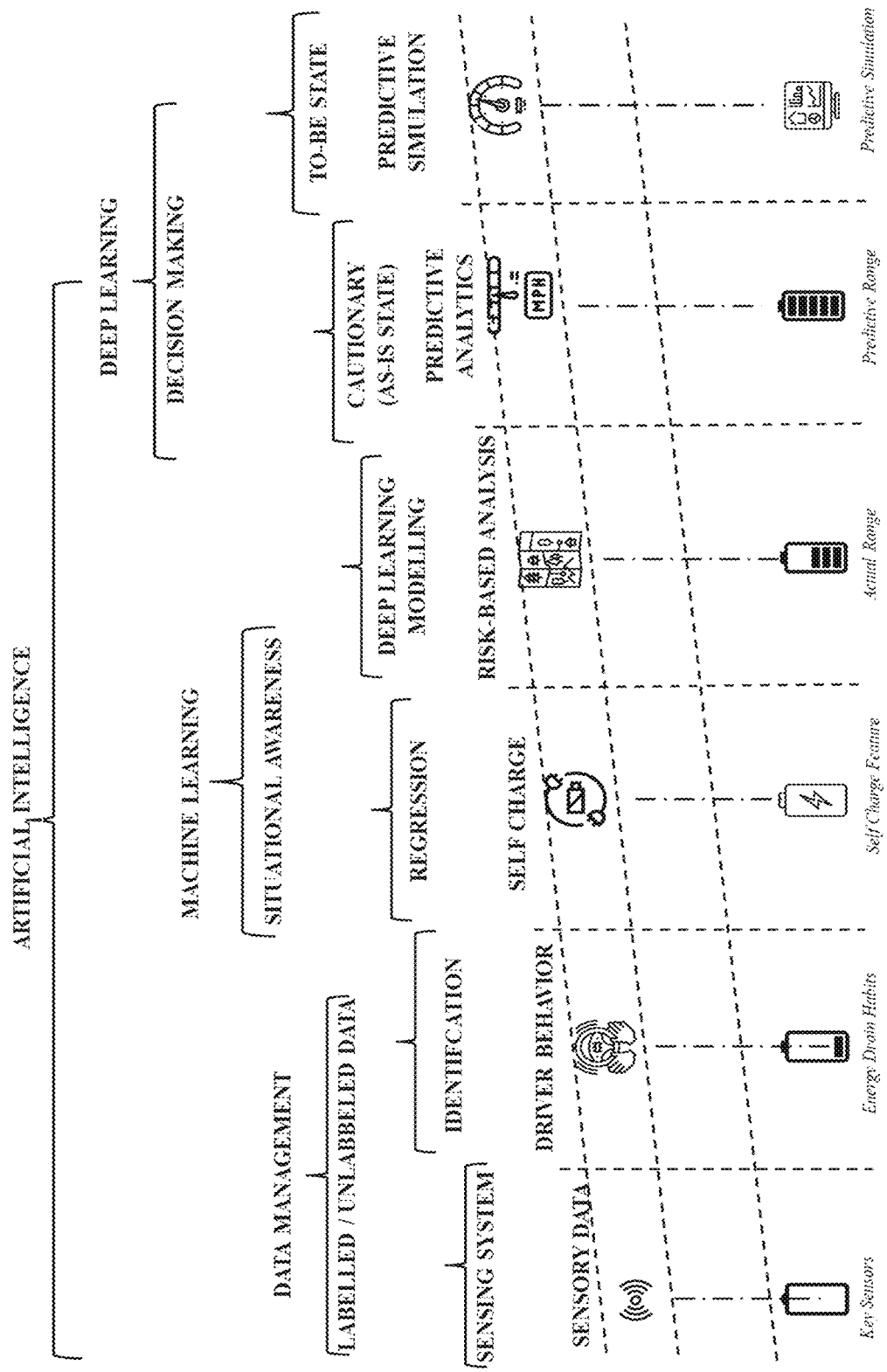
FIG. 12 depicts range prediction using simulation using deep learning by the smart battery system, in one or more embodiments.

FIG. 12 depicts range prediction using simulation using deep learning by the system, in one or more embodiments. Based on training of the AI engine using labelled and unlabeled data obtained from a data management platform, the machine learning, and more specifically deep learning, is to be used for situational awareness and decision making. A regression-based model is to be used to identify self-charging features and the actual range and the predictive range for the battery, which will be obtained using risk-based analysis, predictive analysis, and predictive simulation.

Figure 13:
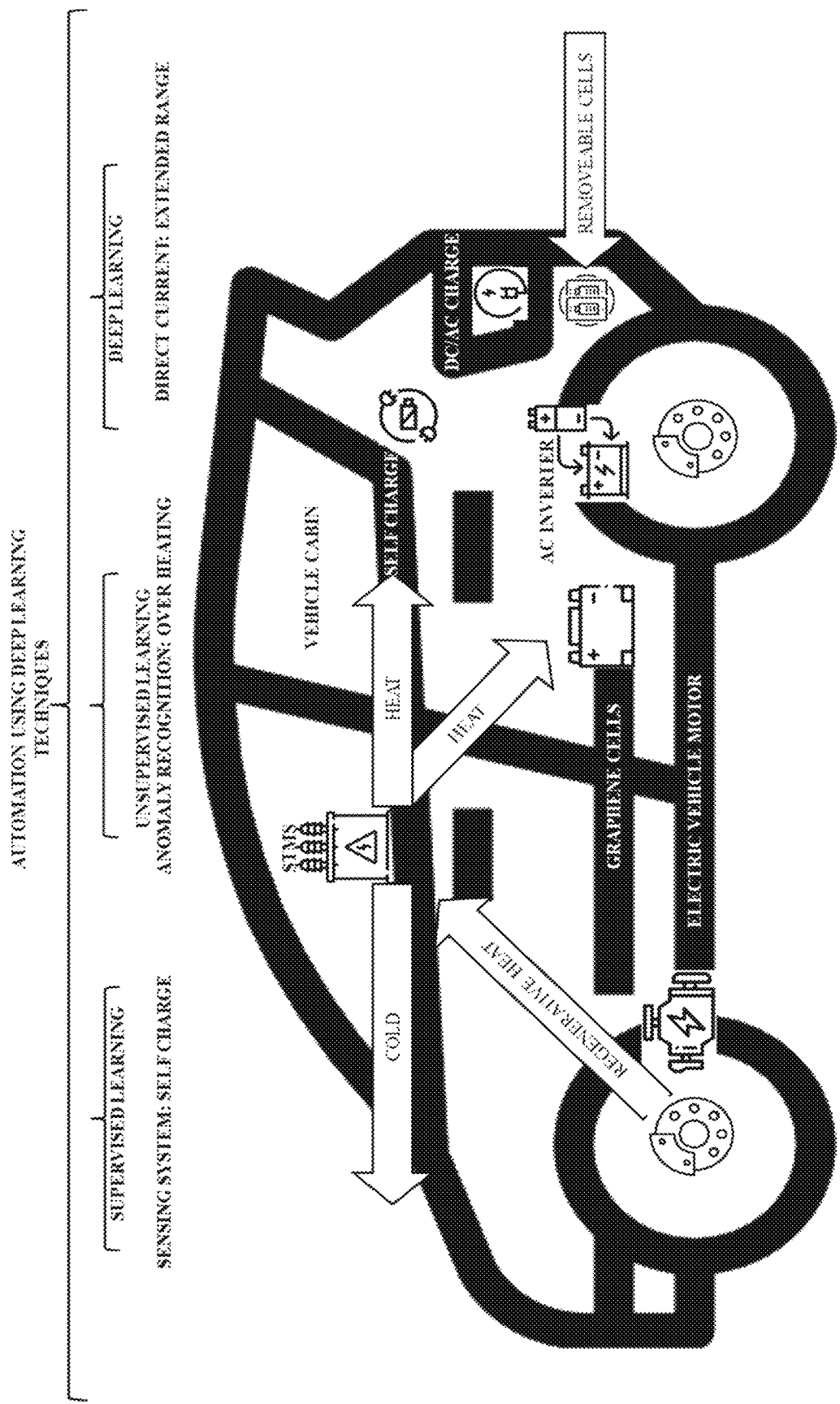
FIG. 13 depicts automation using deep learning techniques for self-charging, anomaly recognition and range extension in the smart battery system, in one or more embodiments.

FIG. 13 depicts automation using deep learning techniques for self-charging, anomaly recognition and range extension in the system, in one or more embodiments. The smart rechargeable energy storage battery system such as an electric vehicle battery will comprises a collection of cells or cell assemblies, with housing, electrical connections, and supportive electronics such as a STMS and an effective SEMS for effective thermal regulation, equilibrizing the energy flow, overall safety, and protection. An innovative smart thermal management strategy, for a smart battery based electric vehicle, can be used to balance the energy demand, and extend the lifetime of the car components—particularly of the battery—at optimal levels of efficiency.

In an embodiment, an external STMS that manages temperature may allow for both cooling and self-heating based on external temperature changes, for keeping the internal temperature regulated and for promoting fast charging. As the electron flow increases, the internal cells heat up allowing for more rapid charge and long range by arresting any loss of capacity. A heat sensor attached to a STMS can be used to encourage electrons to flow through a connector into the battery cells when the temperature is below the set limit and rapidly heat up to promote rapid charging. The artificial intelligence AI ML RNN models, using the vast amounts of real-time unstructured and unlabeled data, can constantly learn to optimize the set temperatures by comparing the charge time to the temperature outside and inside the cell before initiating the self-heating thereby regulating the charge cycles. In short, the smart battery configuration can be able to constantly regulate and maintain the internal heating and then switch to charging the carbon-based or smart material-based cells that need equilibrizing and charging autonomously.

In an embodiment, AIML based thermal detectors will be used to regulate cell pack temperature and encourage fast and safe charging. AIML based models are to be used to self-learn to enable optimal cell pack self-heating functions using AIML algorithms.

In an embodiment, immersive technology will be used to simulate and allow users to monitor the range, adjust the driving patterns, adjust the cabin heating/cooling temperature, react to notifications and alerts, adjust the set temperature thresholds, or adjust the self-heating and self-charging features remotely via mobile applications.

Frequent charging and discharging of the battery impact the life of the battery. To avoid these, a smart capacitor bank or ultracapacitors may be added to the system. Ultracapacitors or supercapacitors can discharge and charge for many cycles without any performance degradation, which helps in increasing the life of the battery. The ultracapacitor has a fast response, which helps in capturing the energy peaks/surge effectively during the regenerative braking operation. The reason for choosing an ultracapacitor is that it can store 20 times more energy than electrolytic capacitors.

In an embodiment, the system may house a DC-to-DC converter. During acceleration, the boost operation will allow the capacitor to discharge up to a threshold value. During deceleration (i.e., braking) the brake operation will allow the capacitor to charge. The ultracapacitors have a good transient response, which is useful during vehicle starts. By storing the recovered energy apart from the battery, it can help in extending the range of the vehicle and can also support sudden acceleration with the help of the boost circuit. Regenerative braking may help in extending the range of the electric vehicle by 8-25%. Apart from saving energy and enhancing the range, it can also help in effective control of the braking operation. In addition to improving the overall efficiency of the vehicle, regeneration can significantly extend the life of the smart energy storage device by maintaining the charge at an optimal level and the life of the overall smart battery and the braking system as the mechanical parts will not wear out very quickly.

In an embodiment, ultracapacitors can be used to store electrical energy for electric vehicle batteries. Ultracapacitors have very high-power density and low energy density. A combination of battery and ultracapacitor can be used in electric vehicles to overcome a few drawbacks and to extend the life of the smart electric battery. Momentary available electric energy from regenerative braking can be stored in ultracapacitors and eventually be used to charge the smart electric battery. The kinetic energy is converted to thermal energy whenever motion with friction occurs, for example when a viscous fluid is stirred. The coefficient of kinetic friction is assigned the Greek letter "mu" ($\mu$), with a subscript "k". The force of kinetic friction is $\mu_k$ times the normal force on an object and is expressed in units of Newtons (N).

Force of kinetic friction=(coefficient of kinetic friction) (normal force)

$$F_k = \mu_k \eta$$

$F_k$=force of kinetic friction
$\mu_k$=coefficient of kinetic friction
$\eta$=normal force (Greek letter "eta")

In other words, it is most efficient method to use an intelligent sensor device that has its own built-in energy storage device.

Figure 14:
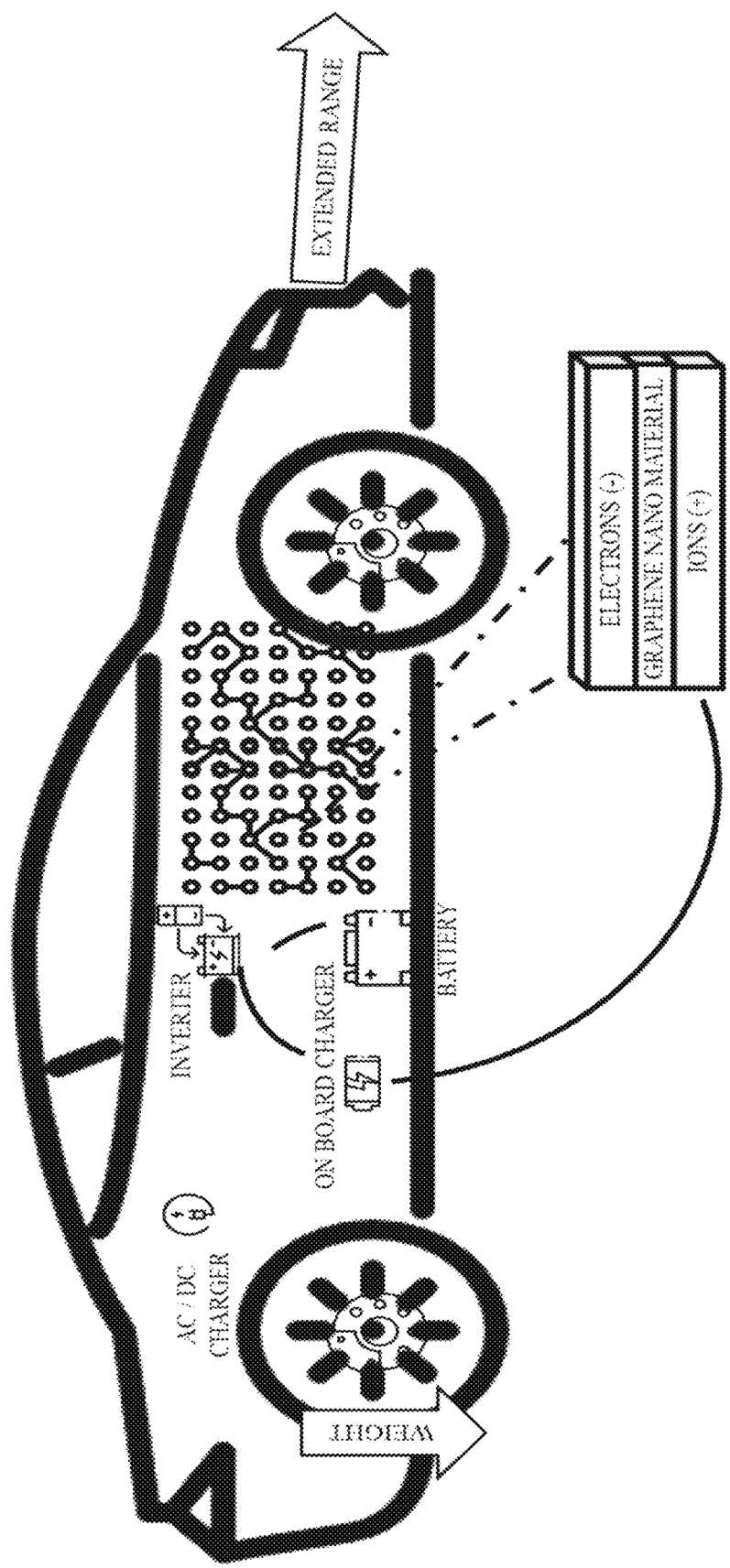
FIG. 14 depicts energy flow automation using the smart battery system, in one or more embodiments.

FIG. 14 depicts energy flow automation using the system, in one or more embodiments. IoT and AIML based models enable real time energy flow and energy management via internal SEMS and STMS to manage smart utilization of alternate energy storage such as the EV body panel, removable cells, or even energy generated and stored via regenerative braking.

The demands from the smart rechargeable energy storage device and the battery management systems are that the acceptable operating temperature range for a battery is very narrow and is to operate in very difficult and challenging conditions. So, if one cell in the battery is off and is seen to be failing, the other cells are to take over without impacting the overall performance. In other words, the system is to initiate a smart switchover in anticipation of a full failover that could result in damaged cells. As a result, the EV battery pack is to deploy temperature sensors, voltage sensors, current sensors, that are sensing everything all the time and generating meaningful data for the intelligent edge and AIML engine to work on predictive analysis and continually render real-time simulated displays and thus providing situational awareness and enable decision making by the smart system and the users in real-time.

At the same time, a supported high-performance thermal management for the battery pack, while it is being charged, is going to be key to avoid down-time. While charging, the smart system acts to harness all the available energy and avoid having to dump or waste any amount of energy. So, it comes down to managing the system in the most optimal way to achieve charging in less time without wasting energy or without taking the energy from the grid and dumping it. Traditionally, the EV industry has used silicon to do power electronics, but most recently, the need is to move into pure carbon-based or smart material-based wide bandgap semiconductor materials that have wonderful properties that make them better for high voltage, for high power electronics and will refrain from further degrading and damaging the environment. Therefore, from a safety perspective, the need is to detect and analyze these permutations and combinations, that can be processed by high performance specialized AIML software in real-time using both structured and randomly encountered unstructured data to be able to sense its environment and react to pertinent safety risks or changing normal patterns with little or no human input and autonomously and intelligently, on the fly, detect and manage fault situations and ensure continuity of operations.

In an aspect, a non-transitory computer readable medium is described herein. The non-transitory computer readable medium comprises instructions, that when read by a processor, cause the processor to perform: connecting a monitoring module and an Internet of Things (IoT) based control module of a rechargeable energy storage battery system of an electric vehicle, to a smart battery management platform and a blockchain network that includes a plurality of charging station nodes; receiving periodically by the smart battery management platform, battery related information from the rechargeable energy storage battery system and one or more environment factors; extracting, processing, and analyzing, the battery related information to retrieve a real-time feature of the rechargeable energy storage battery system and the one or more environment factors that affect battery life and battery performance; predicting in real-time, by the smart battery management platform, battery health and life status by the smart battery management platform; rendering using immersive technology, real-time simulated display of situational awareness by the smart battery management platform; and sending a control signal to the IoT based control module of the rechargeable energy storage battery system by the smart battery management platform.

INCORPORATION BY REFERENCE

All patents, patent application publications, and non-patent literature mentioned in the application are incorporated by reference in their entirety, including:
CN112688405A entitled "Vehicle-mounted intelligent charging system for prolonging service life of storage battery and control method thereof";
US20060276980A1 entitled "Method and apparatus for detecting charged state of secondary battery based on neural network calculation";
US20210221247A1 entitled "Systems for machine learning, optimising and managing local multi-asset flexibility of distributed energy storage resources";
U.S. Pat. No. 9,496,730B2 entitled "Systems and methods for battery management";
CN109755687A entitled "System for precisely heating and cooling battery through graphene film and control method of system";
U.S. Ser. No. 11/035,903B2 entitled "Monitoring of batteries in blockchain networks";
U.S. Ser. No. 10/921,381B2 entitled "Systems and methods for monitoring and presenting battery information";
U.S. Ser. No. 10/821,843B2 entitled "Systems and methods for power management and control";
U.S. Ser. No. 10/505,240B1 entitled "Methods and apparatus for thermal energy management in electric vehicles";
U.S. Pat. No. 9,124,085B2 entitled "Apparatus, method and article for power storage device failure safety";
U.S. Ser. No. 10/197,631B2 entitled "Systems and methods for determining vehicle battery health"; and
U.S. Ser. No. 17/480,383 entitled "Systems, methods and apparatus for improving rechargeable energy storage devices and integrated circuits".

What is claimed is:
1. A system, comprising:
a rechargeable energy storage battery system of an electric vehicle comprising a monitoring module and an Internet of Things (IoT) based control module;
a block-chain network;
a processor;
a tangible non-transitory memory, configured to communicate with the processor, wherein the tangible non-transitory memory has stored thereon instructions executable by the system to cause the system to perform operations comprising:
connecting the monitoring module and the Internet of Things based control module of the rechargeable energy storage battery system of the electric vehicle, to a battery management platform and the block-chain network that includes a plurality of charging station nodes;
receiving periodically by the battery management platform, battery related information and one or more environment factors that is affecting battery life and battery performance;
extracting, processing, and analyzing, the battery related information to retrieve a real-time feature of the rechargeable energy storage battery system and the one or more environment factors affecting the battery life and the battery performance by the battery management platform;
predicting in real-time, by the battery management platform, battery health and life status by the battery management platform;

rendering using immersive technology, real-time simulated display of situational awareness by the battery management platform; and sending a control signal to the IoT based control module of the rechargeable energy storage battery system by the battery management platform;

receiving periodically a geospatial information, a driving pattern, a battery usage information, traffic information, historical information stored onto a first blockchain ledger with a first timestamp, and a personal input comprising a battery identification;

storing the real-time feature of the rechargeable energy storage battery system with a second timestamp onto a second blockchain ledger; and comparing, by the battery management platform, the real-time feature of the rechargeable energy storage battery system with the second timestamp against the historical information stored onto the first blockchain ledger based on battery identification and the first timestamp.

2. The system of claim 1, wherein the rechargeable energy storage battery system comprises at least one of a lithium-ion battery, a lithium iron phosphate battery, a nickel-metal hydride battery, a nickel cobalt aluminum battery, a nickel manganese cobalt battery, an iron-based battery, a sodium-ion battery, a graphene-based battery, a lead-acid battery, and an ultracapacitor.

3. The system of claim 1, wherein the battery related information comprises at least one of a charging voltage, a discharging voltage, a current value, an insulation value, a resistance value, a power, a capacitance, an acquisition time of a battery service cycle, a battery warming characteristic, a vehicle characteristic.

4. The system of claim 1, wherein the battery health and life status comprise at least one of a battery performance, a health indicator, a battery lifespan, an existing charge, an energy capacity, a real-time range, a remaining range and one or more battery faults of the rechargeable energy storage battery system.

5. The system of claim 1, wherein the control signal comprises at least one of a temperature regulation signal, a heat regulation signal, a heat utilization signal, a self-charging signal, a cell pack switching signal and an on-off switching signal.

6. The system of claim 1, wherein the monitoring module comprises a sensor array and an IoT device interface.

7. The system of claim 1, wherein the IoT based control module comprises at least one of a smart thermal management system, a smart energy management system, a charging management system, and a cell pack switching system.

8. The system of claim 1, is further operable to detect an anomaly.

9. The system of claim 1, is further operable to providing notification and decision-making support information.

10. The system of claim 1, is further operable to detect a failover.

11. The system of claim 10, is further operable to enable a switchover after detecting the failover.

12. The system of claim 1, is further operable to fine tuning of a charge curve of a fast-charging session using a pre-trained machine learning model.

13. The system of claim 9, wherein the extracting, the predicting, the rendering, and the providing is performed by at least one of a statistical analysis, a deep-learning algorithm via a neural network architecture, an artificial intelligence platform, and a risk-based analysis executing on a cloud-computing platform.

14. The system of claim 1, is further operable to locating a nearest charging station and a fully charged battery in a nearest network.

15. The system of claim 1, is further operable to provide by the battery management platform, at least one of a safety precaution, a disaster impact, and a disaster recovery to support a real-time decision making.

16. A process, comprising:

connecting a monitoring module and an Internet of Things (IoT) based control module of a rechargeable energy storage battery system of an electric vehicle, to a battery management platform and a block-chain network that includes a plurality of charging station nodes;

receiving periodically by the battery management platform, battery related information and one or more environment factors affecting battery life and battery performance;

extracting, processing, and analyzing, the battery related information to retrieve a real-time feature of the rechargeable energy storage battery system and the one or more environment factors affecting the battery life and the battery performance;

predicting in real-time, by the battery management platform, battery health and life status;

rendering using immersive technology, real-time simulated display of situational awareness;

sending a control signal to the IoT based control module of the rechargeable energy storage battery system;

receiving periodically a geospatial information, a driving pattern, a battery usage information, traffic information, historical information stored onto a first blockchain ledger with a first timestamp, and a personal input comprising a battery identification;

storing the real-time feature of the rechargeable energy storage battery system with a second timestamp onto a second blockchain ledger; and comparing, by the battery management platform, the real-time feature of the rechargeable energy storage battery system with the second timestamp against the historical information stored onto the first blockchain ledger based on battery identification and the first timestamp; and wherein the process is configured for managing the rechargeable energy storage battery system via one of a battery charging station and a battery service station.

17. The process of claim 16, wherein the rechargeable energy storage battery system comprises at least one of a lithium-ion battery, a lithium iron phosphate battery, a nickel-metal hydride battery, a nickel cobalt aluminum battery, a nickel manganese cobalt battery, an iron-based battery, a sodium-ion battery, a graphene-based battery, a lead-acid battery, a smart material-based battery, and an ultracapacitor.

18. A non-transitory computer readable medium comprising instructions, that when read by a processor, cause the processor to perform:

connecting a monitoring module and an Internet of Things (IoT) based control module of a rechargeable energy storage battery system of an electric vehicle, to a battery management platform and a block-chain network that includes a plurality of charging station nodes;

receiving periodically by the battery management platform, battery related information from the rechargeable energy storage battery system and one or more environment factors affecting battery life and battery performance;

extracting, processing, and analyzing, the battery related information to retrieve a real-time feature of the rechargeable energy storage battery system and the one or more environment factors affecting the battery life and the battery performance;

predicting in real-time, by the battery management platform, battery health and life status by the battery management platform;

rendering using immersive technology, real-time simulated display of situational awareness by the battery management platform; and sending a control signal to the IoT based control module of the rechargeable energy storage battery system by the battery management platform;

receiving periodically a geospatial information, a driving pattern, a battery usage information, traffic information, historical information stored onto a first blockchain ledger with a first timestamp, and a personal input comprising a battery identification;

storing the real-time feature of the rechargeable energy storage battery system with a second timestamp onto a second blockchain ledger; and comparing, by the battery management platform, the real-time feature of the rechargeable energy storage battery system with the second timestamp against the historical information stored onto the first blockchain ledger based on battery identification and the first timestamp.

\* \* \* \* \*